(12) United States Patent
Cho et al.

(10) Patent No.: US 10,717,793 B2
(45) Date of Patent: Jul. 21, 2020

(54) OLEFIN POLYMER AND METHOD FOR PREPARING SAME

(71) Applicant: LG Chem, Ltd., Seoul (KR)

(72) Inventors: Sol Cho, Daejeon (KR); Ki Soo Lee, Daejeon (KR); Heon Yong Kwon, Daejeon (KR); Sung Hyun Park, Daejeon (KR); Myung Han Lee, Daejeon (KR); Oh Joo Kwon, Daejeon (KR); Seung Mi Lee, Daejeon (KR); Eun Ji Shin, Daejeon (KR); Hyun Jee Kwon, Daejeon (KR); Sung Ho Park, Daejeon (KR); Seul Ki Im, Daejeon (KR); Jin Young Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/313,640

(22) PCT Filed: Nov. 7, 2017

(86) PCT No.: PCT/KR2017/012508
§ 371 (c)(1),
(2) Date: Dec. 27, 2018

(87) PCT Pub. No.: WO2018/117408
PCT Pub. Date: Jun. 28, 2018

(65) Prior Publication Data
US 2019/0225721 A1    Jul. 25, 2019

(30) Foreign Application Priority Data

Dec. 22, 2016  (KR) .................. 10-2016-0177069
Feb. 27, 2017  (KR) .................. 10-2017-0025593

(51) Int. Cl.
| | | |
|---|---|---|
| C08L 23/08 | (2006.01) | |
| C08F 210/16 | (2006.01) | |
| C08F 4/653 | (2006.01) | |
| C08J 5/18 | (2006.01) | |
| C08F 4/6592 | (2006.01) | |
| C08F 4/659 | (2006.01) | |
| B29C 48/10 | (2019.01) | |
| B29C 48/00 | (2019.01) | |
| B29K 23/00 | (2006.01) | |
| B29K 105/00 | (2006.01) | |

(52) U.S. Cl.
CPC .............. *C08F 210/16* (2013.01); *C08J 5/18* (2013.01); *C08L 23/0815* (2013.01); *B29C 48/0018* (2019.02); *B29C 48/022* (2019.02); *B29C 48/10* (2019.02); *B29K 2023/08* (2013.01); *B29K 2105/0014* (2013.01); *B29K 2105/0085* (2013.01); *C08F 4/65912* (2013.01); *C08F 4/65916* (2013.01); *C08F 4/65925* (2013.01); *C08F 4/65927* (2013.01); *C08F 2420/01* (2013.01); *C08J 2323/08* (2013.01); *C08J 2323/20* (2013.01)

(58) Field of Classification Search
CPC ..... C08L 23/08; C08F 210/16; C08F 4/65904
See application file for complete search history.

(56) References Cited

U.S. PATENT DOCUMENTS

| | | | |
|---|---|---|---|
| 6,153,549 A | 11/2000 | Hubscher et al. | |
| 6,492,472 B2 | 12/2002 | Lue | |
| 9,605,097 B2* | 3/2017 | Sukhadia | ............... C08F 210/08 |
| 10,113,016 B2* | 10/2018 | Sukhadia | ............... C08F 210/16 |
| 2005/0033000 A1 | 2/2005 | Ohta et al. | |
| 2011/0217537 A1 | 9/2011 | Fantinel et al. | |
| 2014/0194277 A1 | 7/2014 | Ishihama | |
| 2014/0275427 A1 | 9/2014 | Nummila-Pakarinen et al. | |
| 2015/0225497 A1 | 8/2015 | Kim et al. | |
| 2016/0137822 A1 | 5/2016 | den Doelder et al. | |
| 2016/0237188 A1 | 8/2016 | Hong et al. | |
| 2016/0280813 A1 | 9/2016 | Kwon et al. | |
| 2016/0333124 A1 | 11/2016 | Sung et al. | |
| 2017/0320978 A1 | 11/2017 | Jeong et al. | |
| 2018/0194873 A1* | 7/2018 | Kwon | ....................... C08F 4/52 |
| 2018/0251584 A1* | 9/2018 | Cho | ...................... C08F 210/02 |

FOREIGN PATENT DOCUMENTS

| | | |
|---|---|---|
| EP | 3312201 A2 | 4/2018 |
| JP | 2013227271 A | 11/2013 |
| JP | 5487089 B2 | 5/2014 |
| KR | 20020054318 | 7/2002 |
| KR | 101038592 B1 | 6/2011 |
| KR | 20140085579 A | 7/2014 |
| KR | 20150045368 A | 4/2015 |
| KR | 20150063885 A | 6/2015 |
| KR | 20160030886 A | 3/2016 |
| KR | 101619396 B1 | 5/2016 |
| KR | 20160069467 A | 6/2016 |
| KR | 20160072779 A | 6/2016 |
| KR | 20160084181 A | 7/2016 |
| KR | 101685664 B1 | 12/2016 |
| KR | 20170099694 A | 9/2017 |
| WO | 0246250 A2 | 6/2002 |
| WO | 03016366 A1 | 2/2003 |

OTHER PUBLICATIONS

Extended European Search Report including the Written Opinion for Application No. EP 17884317.3 dated Aug. 13, 2019, pp. 1-10.

(Continued)

*Primary Examiner* — Caixia Lu
(74) *Attorney, Agent, or Firm* — Lerner, David, Littenberg, Krumholz & Mentlik, LLP

(57) ABSTRACT

The present invention provides an olefin polymer in which LCB (long chain branch) is introduced into mLLDPE (metallocene linear low-density polyethylene) to control the storage modulus, whereby the olefin polymer has excellent bubble stability and processing load characteristics and exhibits excellent processability during preparation of a film, and further has excellent mechanical properties and transparency.

12 Claims, 1 Drawing Sheet

(56) References Cited

OTHER PUBLICATIONS

Search report from International Application No. PCT/KR2017/012508, dated Mar. 26, 2018.
Chiu, Melanie, et al., "Synthesis, Structural Characterization, and Quantitative Basicity Studies of Lithium Zirconimidate Complexes." Angewandte Chemie, vol. 487, Received Mar. 27, 2008; Published online Jul. 9, 2008, pp. 6073-6076.

* cited by examiner

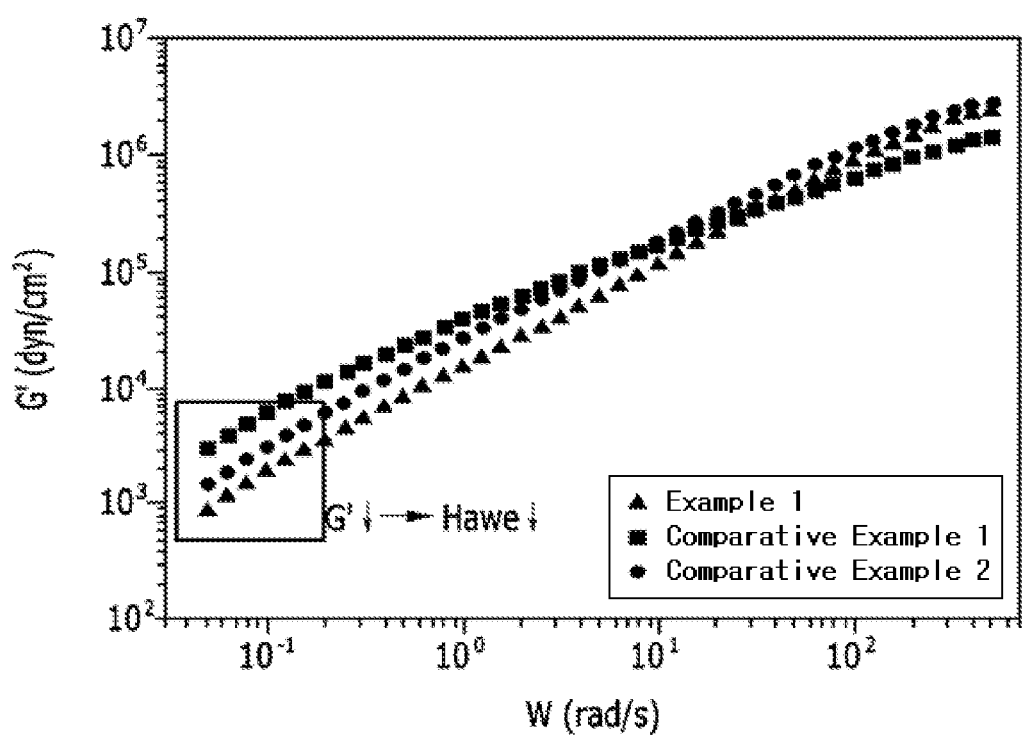

OLEFIN POLYMER AND METHOD FOR PREPARING SAME

CROSS-REFERENCE TO RELATED APPLICATIONS

The present application is a national phase entry under 35 U.S.C. § 371 of International Application No. PCT/KR2017/012508 filed Nov. 7, 2017, which claims priority from Korean Patent Application No. 10-2016-0177069 filed Dec. 22, 2016 and Korean Patent Application No. 10-2017-0025593 filed Feb. 27, 2017, all of which are incorporated herein by reference.

TECHNICAL FIELD

The present invention relates to an olefin polymer having excellent processability, improved mechanical properties and transparency, and a method for preparing the same.

BACKGROUND ART

Linear low-density polyethylene (LLDPE) is produced by copolymerizing ethylene and alpha olefin using a polymerization catalyst under low pressure. Thus, this is a resin having a narrow molecular weight distribution and a certain length of a short chain branch, without a long chain branch. The LLDPE film has high strength and elongation at break in addition to the properties of a general polyethylene and exhibits excellent tear strength, falling weight impact strength or the like. This has led to an increase in the use of a stretch film, an overlapping films or the like which is difficult to apply existing low density polyethylene or high density polyethylene.

However, LLDPE is excellent in mechanical properties, but its blown film processability is poor. A blown film is a film produced by a method of blowing air into a molten plastic and inflating it, which is also called an inflation film.

Bubble stability, processing load and the like should be considered as factors to consider when processing a blown film. Especially, bubble stability should be considered important. The bubble stability means a property that when a film is produced by injecting air into a molten plastic, the produced film maintains its shape without being broken, which is related to the melt strength (MS).

The melt strength means strength for maintaining a shape that is resistant to molding and processing in a softened and melted state. The melt strength of low density polyethylene (LDPE) is higher than that of LLDPE. This is because, in the case of LDPE, branched chains are entangled with each other as compared with LLDPE, which is more advantageous in enduring the molding and processing. Thus, in order to supplement the melt strength of LLDPE, a method of producing a film by blending LDPE (low-density polyethylene) has been proposed. However, the above method has a problem of remarkably lowering the mechanical properties of conventional LLDPE even when LDPE is added in a very small amount.

PRIOR ART LITERATURE

Patent Literature (Patent Literature 1) Japanese Patent Registration No. 5487089 (registered on Feb. 28, 2014)

DETAILED DESCRIPTION OF THE INVENTION

Technical Problem

It is an object of the present invention to provide an olefin polymer which has excellent bubble stability and processing load characteristics and thus exhibits excellent processability during production of a film, as well as has improved mechanical properties, and further improve transparency during production of a film through control of initial storage modulus in the polymer.

It is another object of the present invention to provide a method for preparing the above-mentioned olefin polymer.

It is still another object of the present invention to provide a hybrid supported catalyst which is easy to produce the above olefin polymer.

It is a further object of the present invention to provide a film comprising the above-mentioned olefin polymer and thus exhibiting high transparency.

Technical Solution

According to one embodiment of the present invention, there is provided an olefin polymer having a haze parameter of 11 or less which is determined according to the following equation 1:

$$\text{Haze parameter} = 0.0036 \times G' + 6.25 + 400 \times (D - 0.920) \quad \text{[Equation 1]}$$

In the above equation 1,

D is a density of the olefin polymer measured according to ASTM D792, and

G' is a storage modulus measured at 5% strain and 0.05 rad/s in the dynamic strain sweep frequency mode using an ARES rheometer.

The olefin polymer may have a storage modulus of 1500 dyn/cm$^2$ or less.

The olefin polymer may have a density of 0.910 g/cm$^3$ to 0.930 g/cm$^3$.

In addition, the olefin polymer may have a strength factor (SF) of 50 or more which is determined according to the following equation 2:

$$SF = Mw/10^4 + 5/(Mw/10^5) \times \exp(\text{ratio of increase in elongational viscosity}) \quad \text{[Equation 2]}$$

in the above equation 2, Mw means a weight average molecular weight, the ratio of increase in elongational viscosity is a value in which the highest elongational viscosity value measured for the olefin polymer at Hencky strain rate of 1 s$^{-1}$ at 170° C. using an extensional viscosity fixture attached to the ARES rheometer is divided by the elongational viscosity value of the extrapolated straight line at the time when the highest elongational viscosity value is obtained, wherein the extrapolated straight line is a straight line in which a straight line having the average slope of the section where the elongational viscosity increases steadily with time is extended to a section where the elongational viscosity increases sharply while maintaining the above average slope.

The olefin polymer may have a ratio of increase in elongational viscosity of 2.0 or more.

The olefin polymer may have a melt index of 0.3 g/10 min or more and less than 4 g/10 min, which is measured at a temperature of 190° C. under a load of 2.16 kg according to standard ASTM D 1238.

The olefin polymer may have a number average molecular weight of 20,000 g/mol to 60,000 g/mol.

The olefin polymer may have a weight average molecular weight of 90,000 g/mol to 160,000 g/mol.

The olefin polymer may have MFRR (21.6/2.16) of 18 or more and less than 40 in which a melt flow rate ($MFR_{21.6}$) measured at a temperature of 190° C. under a load of 21.6 kg according to ISO 1133 is divided by a melt flow rate ($MFR_{2.16}$) measured at a temperature of 190° C. under a load of 2.16 kg according to ISO 1133.

The olefin polymer may have a melt strength of 50 mN to 100 mN.

The olefin polymer may be a copolymer of ethylene and alpha olefin, more specifically, ethylene-1-hexene copolymer.

Meanwhile, according to another embodiment of the present invention, there is provided a method for preparing an olefin polymer, the method comprising a step of polymerizing an olefin monomer in the presence of a hybrid supported catalyst containing a support, a first transition metal compound represented by the following Chemical Formula 1 that is supported on the support, and a second transition metal compound represented by the following Chemical Formula 2 that is supported on the support.

[Chemical Formula 1]

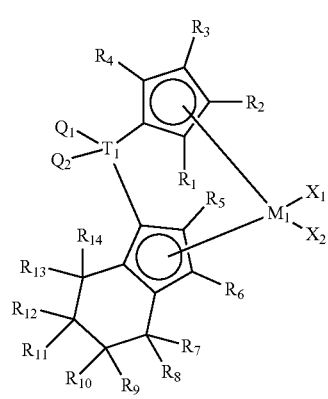

in the above formula 1, $M_1$ is Ti, Zr or Hf, $X_1$ and $X_2$ are the same as or different from each other, and each independently represent any one of a halogen, a nitro group, an amido group, a phosphine group, a phosphide group, an alkyl group having 1 to carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, $T_1$ is C, Si, Ge, Sn or Pb, $Q_1$ and $Q_2$ are the same as or different from each other, and each independently represent any one of hydrogen, a halogen, an alkyl group having 1 to 20 carbon atoms, a heterocycloalkyl group having 2 to carbon atoms, an alkoxy group having 1 to 20 carbon atoms, an alkoxyalkyl group having 2 to 20 carbon atoms, a carboxylate having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms, and a heteroaryl group having 5 to 20 carbon atoms, $R_1$ to $R_6$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, $R_7$ to $R_{14}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_7$ to $R_{14}$ are connected with each other to form a substituted or unsubstituted aliphatic or aromatic ring,

[Chemical Formula 2]

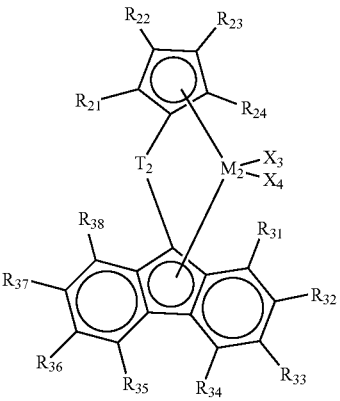

in the above formula 2, $M_2$ is Ti, Zr or Hf, $X_3$ and $X_4$ are the same as or different from each other, and each independently represent any one of a halogen, a nitro group, an amido group, a phosphine group, a phosphide group, an alkyl group having 1 to carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, $T_2$ is any one of $T_3(Q_3)(Q_4)$ and an alkylene group having 2 to 5 carbon atoms, $T_3$ is C, Si, Ge, Sn or Pb, $Q_3$ and $Q_4$ are the same as or different from each other, and each independently represent any one of hydrogen, a halogen, an alkyl group having 1 to 20 carbon atoms, a heterocycloalkyl group having 2 to carbon atoms, an alkoxy group having 1 to 20 carbon atoms, an alkoxyalkyl group having 2 to 20 carbon atoms, a carboxylate having 1 to 20 carbon atoms, an alkenyl group having 2 to 20 carbon atoms, an aryl group having 6 to 20 carbon atoms and a heteroaryl group having 5 to 20 carbon atoms, or are connected with each other to form a substituted or unsubstituted aliphatic or aromatic ring, $R_{21}$ to $R_{24}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, and $R_{31}$ to $R_{38}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_{31}$ to $R_{38}$ are connected with each other to form a substituted or unsubstituted aliphatic or aromatic ring, Specifically, in Chemical Formula 1, $T_1$ is Si, $Q_1$ and $Q_2$ may be each independently any one of an alkyl group having 1 to 20 carbon atoms, an aryl group having 6 to 20 carbon atoms, an alkylaryl group having 7 to 20 carbon atoms, and an arylalkyl group having 7 to 20 carbon atoms.

More specifically, the first transition metal compound may be any one of the compounds represented by the following Chemical Formulas 1a and 1b:

[Chemical Formula 1a]

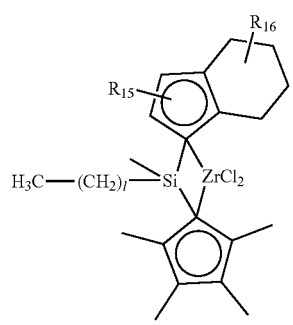

[Chemical Formula 1b]

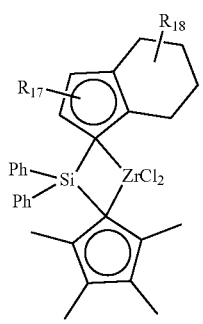

in the above formulas 1a and 1b, $R_{15}$ to $R_{18}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, an alkoxysilyl group having 1 to 20 carbon atoms, an silyloxyalkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, l is an integer between 0 and 5, and Ph is a phenyl group.

Further, in Chemical Formula 2, at least one of $R_{21}$ to $R_{24}$ is an alkoxyalkyl group having 2 to 20 carbon atoms, and the remaining functional group may be hydrogen.

Further, in Chemical Formula 2, $T_2$ is $T_3(Q_3)$ $(Q_4)$ wherein $T_3$ is C, and $Q_3$ and $Q_4$ are the same as or different from each other, and each independently represent an alkyl group having 1 to 20 carbon atoms, or are connected with each other to form a cycloalkyl group having 3 to 12 carbon atoms, or an aryl group having 6 to 12 carbon atoms.

More specifically, the second transition metal compound may be any one of the compounds represented by the following structural formulas:

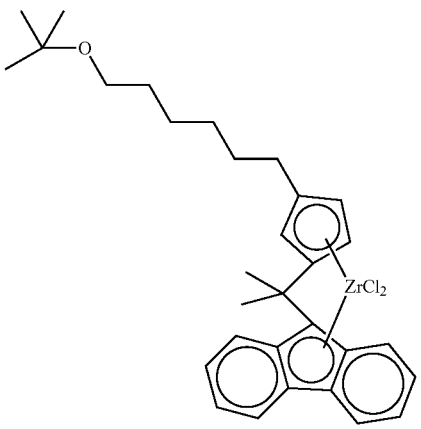

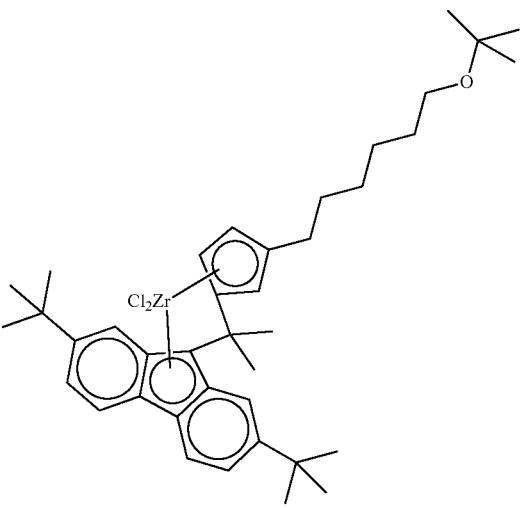

and

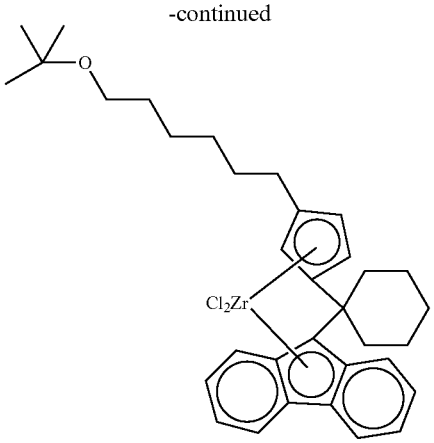

In the hybrid supported catalyst, the support may be silica, alumina, magnesia, or a mixture thereof.

In the hybrid supported catalyst, the first transition metal compound and the second transition metal compound may be contained in a weight ratio of 50:1 to 1:1.

According to another embodiment of the present invention, there is provided a hybrid supported catalyst comprising: a support, a first transition metal compound represented by Chemical Formula 1 that is supported on the support, and a second transition metal compound represented by Chemical Formula 2 that is supported on the support.

According to still another embodiment of the present invention, there is provided a blown film comprising the above-mentioned olefin polymer, wherein the film has a haze of 10% or less as measured according to ISO 14782.

Advantageous Effects

The olefin polymer according to one embodiment of the present invention has excellent bubble stability and processing load characteristics and thus exhibits excellent processability during production of a film, as well as has improved mechanical properties, and further improve transparency during production of a film through control of initial storage modulus in the polymer. Accordingly, it can be useful as a raw material for various products requiring excellent mechanical strength, high processability and transparency. In particular, the excellent processability of the olefin polymer makes it possible to stably produce a film during production of a film by the melt-blowing process, and thus may be useful as a raw material for a product produced by the melt-blowing process.

BRIEF DESCRIPTION OF THE DRAWINGS

FIG. 1 is a graph showing an initial storage modulus according to the frequency of the olefin copolymer of Example 1 and Comparative Examples 1 and 2.

DETAILED DESCRIPTION OF THE EMBODIMENTS

The terminology used herein is for the purpose of describing exemplary embodiments only and is not intended to limit the present invention. Further, singular expressions "a," "an," and "the" used herein may include plural expressions unless the context clearly indicates otherwise. In addition, it should be understood that the meaning of the term "comprising", "including", "having" and the like is intended to specify the presence of stated features, steps, components or combinations thereof and does not exclude existence or addition of one or more other features, steps, components or combinations thereof.

The invention can make various modifications and take various forms, and thus specific embodiments are illustrated and described in detail below. It should be understood, however, that the invention is not intended to be limited to any particular disclosure form, but includes all modifications, equivalents and alternatives falling within the spirit and scope of the invention.

Hereinafter, an olefin polymer and a method for preparing the olefin polymer according to specific embodiments of the invention will be described.

Conventional LLDPE is excellent in mechanical properties, but its blown film processability is poor. In order to improve this, LDPE is mixed in the production of a film to improve processability, but there is a problem that film physical properties such as tensile strength, impact strength and the like are deteriorated.

On the other hand, according to the present invention, LCB (long chain branch) is introduced into mLLDPE (metallocene linear low-density polyethylene), thereby improve bubble stability and processing load characteristics together with mechanical characteristics, and further improving the transparency through control of the storage modulus during production of a film.

That is, according to one embodiment of the invention, there is provided an olefin polymer having a haze parameter of 11 or less which is determined according to the following equation 1:

$$\text{Haze parameter}=0.0036 \times G' + 6.25 + 400 \times (D-0.920) \quad \text{[Equation 1]}$$

In the above equation 1,

D is a density of the olefin polymer measured according to ASTM D792, and

G' is a storage modulus measured at 5% strain and 0.05 rad/s in the dynamic strain sweep frequency mode using an ARES rheometer.

More specifically, the olefin polymer according to one embodiment may have a haze parameter of 5 to 10, more specifically 7 to 9.5, which is determined according to Equation 1.

In the present invention, the haze parameter is a value obtained by digitizing the transparency of the olefin polymer depending on the initial storage modulus and density of the olefin polymer, and the value shows a tendency similar to haze characteristics of the film. That is, the smaller the haze parameter of the olefin polymer, the smaller the haze value of the film produced by using the olefin polymer, and consequently, the film can exhibit more improved transparency. The haze parameter decreases as the storage modulus and density decrease.

On the other hand, the initial storage modulus(G') of the olefin polymer is an energy stored without loss due to elasticity, which is a function of the substance dependent on frequency(ω) regardless of time. The storage modulus is controlled by molecular structure design through adjustment of polymer tail or LCB content, which is an important factor influencing the haze of a film. As the storage modulus become smaller, the surface irregularities during production of a film decrease. As a result, the haze value of the film becomes small, and excellent transparency can be exhibited. Specifically, the olefin polymer according to one embodiment of the present invention may have an initial storage modulus of less than 1500 dyn/cm$^2$ or less, more specifically 500 dyn/cm$^2$ to 1000 dyn/cm$^2$, still more specifically 700 dyn/cm² to 900 dyn/cm². As described above, as the olefin polymer has a low initial storage modulus, the effect of improving haze is excellent, and consequently, the preparation of a film with high transparency is made possible.

In addition, the olefin polymer according to one embodiment of the present invention has a high strength factor (SF) of 50 or more, specifically 60 or more, more specifically 65 or more which is determined by the following Equation 2, and thus can exhibit excellent bubble stability:

$$SF = Mw/10^4 + 5/(Mw/10^5) \times \exp(\text{ratio of increase in elongational viscosity}) \quad \text{[Equation 2]}$$

in the above equation 2, Mw means a weight average molecular weight, the ratio of increase in elongational viscosity is a value in which the highest elongational viscosity value measured for the olefin polymer at Hencky strain rate of 1 s⁻¹ at 170° C. using an extensional viscosity fixture attached to the ARES rheometer is divided by the elongational viscosity value of the extrapolated straight line at the time when the highest elongational viscosity value is obtained, wherein the extrapolated straight line is a straight line in which a straight line having the average slope of the section where the elongational viscosity increases steadily with time is extended to a section where the elongational viscosity increases sharply while maintaining the above average slope.

The content of LCB in the olefin polymer can be digitized through SF calculated by substituting the weight average molecular weight of the olefin polymer and the ratio of increase in elongational viscosity into Equation 2. The melt strength (MS), which is one of the physical properties of the olefin polymer, also tends to increase according to the content of LCB in the olefin polymer. However, when the molecular weight of the olefin polymer is small, the melt strength is greatly affected by the change in the LCB content as compared with the case where the molecular weight is large, and there is a limit to accurately predict the LCB content. On the other hand, the SF calculated by Equation 1 can objectively predict the LCB content of the olefin polymer having various molecular weights by including the weight average molecular weight factor in Equation 2.

The weight average molecular weight (Mw) of Equation 2 is a value based on the standard polystyrene measured by gel permeation chromatography (GPC). However, the weight average molecular weight is not limited thereto and it may be measured by other methods known in the technical field to which the present invention belongs.

The ratio of increase in elongational viscosity of Equation 2 is a value in which the highest elongational viscosity value measured for the olefin polymer at Hencky strain rate of 1 s⁻¹ at 170° C. using an extensional viscosity fixture attached to the ARES rheometer is divided by the elongational viscosity value of the extrapolated straight line at the time when the highest elongational viscosity value is obtained. Specifically, when the elongational viscosity of the olefin polymer is measured using an elongational viscosity fixture attached to an ARES rheometer, a graph capable of confirming the change in elongational viscosity (unit: Pa·s) with time can be obtained.

In the case of conventional LLDPE, the elongational viscosity tends to increase steadily with time, but it does not exhibit strain-hardening properties in which the elongational viscosity increases sharply. On the other hand, in the case of the olefin polymer according to one embodiment of the present invention, it shows strain hardening properties in which the elongational viscosity increases steadily with time, and then the elongational viscosity increases sharply. It can be predicted that as such strain-hardening properties are severely exhibited, that is, as the elongational viscosity increases more sharply, the content of LCB in the olefin polymer tends to be higher.

Furthermore, it can be predicted to exhibit more excellent processablity during the formation of a film using the olefin polymer. It is generally confirmed that strain-hardening properties are more severely exhibited in the case of LDBE containing a large amount of LCB.

In order to digitize the degree of strain-hardening properties, the ratio of increase in elongation viscosity was determined on the basis of the following criteria. Specifically, the ratio of increase in elongation viscosity was determined by dividing the measured highest elongational viscosity value by the elongation viscosity value of the extrapolated straight line at the time when the highest elongation viscosity value is obtained. Here, the extrapolated straight line means a straight line in which a straight line having the average slope of the section where the elongational viscosity increases steadily with time is extended to a section where the elongational viscosity increases sharply while maintaining the above average slope. The section where the elongational viscosity increases steadily with time means a section in which the X axis (time) is 0.001 second to 1 second, 0.001 second to 0.5 second, or 0.01 second to 0.5 second, and the section where the elongational viscosity increases sharply means a section after a section where the elongational viscosity increases steadily with time, that is, a section where the X-axis (time) exceeds 0.5 seconds or a section where the X-axis (time) exceeds 1 second. Therefore, the extrapolated straight line means a straight line in which the straight line of the section where the X axis (time) is 0.001 second to 1 second, 0.001 second to 0.5 second, or 0.01 second to 0.5 second is extended to a section where X axis (time) exceeds 0.5 second to 1 second, while maintaining the slope of the straight line. As an example, the extrapolated straight line can be obtained using Extrapolate in OriginPro 8.6 program. Specifically, the extrapolated straight line can be obtained by extending a straight line (a graph of the elongational viscosity actually measured with time) obtained by specifying the section of the X axis from 0.01 to 0.5 in Extrapolate Manu to a section where the elongational viscosity increases sharply. At his time, in order to obtain the extrapolated straight line, the method uses B-Spline, and apparent interpolation is used in Extrapolate Manu.

Further, the olefin polymer according to one embodiment described above has the ratio of increase in elongational viscosity of 2.0 or more, which can exhibit improved processability while maintaining excellent mechanical strength. In addition, the upper limit of the ratio of increase in elongational viscosity is 5 or less, more specifically 2.5 or less in order to maintain sufficient mechanical strength.

As the value of SF calculated by Equation 2 is higher, it can secure excellent processability at the time of film formation, and thus the upper limit of the SF is not particularly limited. As a non-limiting example, the SF may be adjusted to 200 or less, specifically 150 or less.

The olefin polymer according to one embodiment of the invention may exhibit physical properties similar to those of LLDPE in order to maintain excellent mechanical properties of conventional LLDPE.

As an example, the olefin polymer can have a density of 0.910 g/cm³ to 0.940 g/cm³.

The olefin polymer has a number average molecular weight of 20,000 g/mol to 60,000 g/mol and a weight average molecular weight of 90,000 g/mol to 160,000 g/mol.

The olefin polymer can have a melt index (MI) of 0.5 g/10 min or more and less than 3 g/10 min, which is measured at a temperature of 190° C. under a load of 2.16 kg according to standard ASTM D1238.

The olefin polymer may have MFRR (21.6/2.16) of or more and less than 40 in which a melt flow rate ($MFR_{21.6}$) measured at a temperature of 190° C. under a load of 21.6 kg according to ISO 1133 is divided by a melt flow rate ($MFR_{20.16}$) measured at a temperature of 190° C. under a load of 2.16 kg according to ISO 1133.

The olefin polymer may have a melt strength (MS) measured at 190° C. between 50 mN and 100 mN, more specifically between 60 mN and 75 mN.

In the present invention, the melt strength is measured by a method of filling a molten low density polyethylene copolymer in a rheometer equipped with a capillary having an aspect ratio (30 mm in length/2 mm in diameter) of 15, producing a strand at a shear rate of 72/s, and then measuring the force (mN) until the strand breaks while being uniaxially stretched at an initial speed of 18 mm/s and an acceleration of 12 mm/s$^2$ with an acceleration wheel. At this time, measurement conditions are as follows.

Capillary: length 30 mm, diameter 2 mm, shear rate 72/s
Wheel: initial speed 18 mm/s, acceleration 12 mm/s$^2$ Even if the haze parameter calculated according to Equation 1 and the SF calculated according to Equation 2 satisfy the above-mentioned range, unless the density, the number average molecular weight, the weight average molecular weight, the melt index, the MFRR and the like as described above are satisfied as in the case of LDPE, sufficient mechanical strength is not exhibited. Thus, even though processability is excellent, it may be a difficulty to apply to actual products. The olefin polymer according to the above embodiment can have at least one of the physical properties mentioned above and can have all the physical properties described above in order to exhibit excellent mechanical strength.

The olefin polymer exhibiting these physical properties may be, for example, a copolymer of ethylene and alpha olefin. In this case, the alpha olefin may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and mixtures thereof. Among them, the olefin polymer may be a copolymer of ethylene and 1-hexene. When the olefin polymer according to one embodiment is the copolymer described above, the physical properties described above can be more easily realized. However, the type of the olefin polymer according to one embodiment is not limited to the above-described types, and various types of olefin polymers known in the technical field to which the present invention belongs may be provided as long as they can exhibit the above-described physical properties.

Meanwhile, according to another embodiment of the present invention, a method for preparing the olefin polymer is provided.

Specifically, the method for preparing the olefin polymer comprises a step of polymerizing an olefin monomer in the presence of a hybrid supported catalyst containing a support, a first transition metal compound represented by the following Chemical Formula 1 that is supported on the support, and a second transition metal compound represented by the following Chemical Formula 2 that is supported on the support.

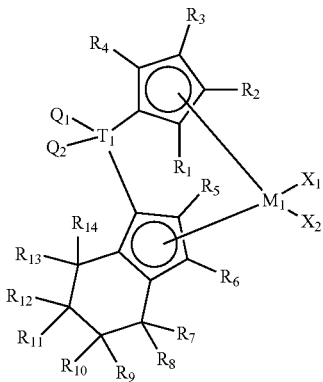

[Chemical Formula 1]

in the above formula 1, $M_1$ is Ti, Zr or Hf, $X_1$ and $X_2$ are the same as or different from each other, and each independently represent any one of a halogen, a nitro group, an amido group, a phosphine group, a phosphide group, an alkyl group having 1 to carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, $T_1$ is C, Si, Ge, Sn or Pb, $Q_1$ and $Q_2$ are the same as or different from each other, and each independently represent any one of hydrogen, a halogen, an alkyl group having 1 to 20 carbon atoms, a heterocycloalkyl group having 2 to carbon atoms, an alkoxy group having 1 to 20 carbon atoms, an alkoxyalkyl group having 2 to 20 carbon atoms, a carboxylate having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms, and a heteroaryl group having 5 to 20 carbon atoms, $R_1$ to $R_6$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, $R_7$ to $R_{14}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_7$ to $R_{14}$ are connected with each other to form a substituted or unsubstituted aliphatic or aromatic ring,

[Chemical Formula 2]

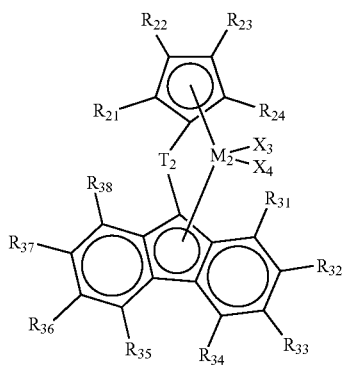

in the above formula 2, $M_2$ is Ti, Zr or Hf, $X_3$ and $X_4$ are the same as or different from each other, and each independently represent any one of a halogen, a nitro group, an amido group, a phosphine group, a phosphide group, an alkyl group having 1 to carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, $T_2$ is any one of $T_3(Q_3)(Q_4)$ and an alkylene group having 2 to 5 carbon atoms, $T_3$ is C, Si, Ge, Sn or Pb, $Q_3$ and $Q_4$ are the same as or different from each other, and each independently represent any one of hydrogen, a halogen, an alkyl group having 1 to 20 carbon atoms, a heterocycloalkyl group having 2 to carbon atoms, an alkoxy group having 1 to 20 carbon atoms, an alkoxyalkyl group having 2 to 20 carbon atoms, a carboxylate having 1 to 20 carbon atoms, an alkenyl group having 2 to 20 carbon atoms, an aryl group having 6 to 20 carbon atoms and a heteroaryl group having 5 to 20 carbon atoms, or are connected with each other to form a substituted or unsubstituted aliphatic or aromatic ring, $R_{21}$ to $R_{24}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, and $R_{31}$ to $R_{38}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, a silyloxyalkyl group having 1 to 20 carbon atoms, an alkenyl group having 2 to 20 carbon atoms, and an aryl group having 6 to 20 carbon atoms, or one or more pairs of adjacent substituents of $R_{31}$ to $R_{38}$ are connected with each other to form a substituted or unsubstituted aliphatic or aromatic ring, Unless otherwise specified, the following definitions shall apply to the terms used in the specification.

The halogen may be fluorine (F), chlorine (Cl), bromine (Br) or iodine (I).

The alkyl group having 1 to 20 carbon atoms may be a linear, branched or cyclic alkyl group. Specifically, the alkyl group having 1 to 20 carbon atoms may be a linear alkyl group having 1 to 20 carbon atoms; a linear alkyl group having 1 to 10 carbon atoms; a linear alkyl group having 1 to 5 carbon atoms; a branched or cyclic alkyl group having 3 to 20 carbon atoms; a branched or cyclic alkyl group having 3 to 15 carbon atoms; or a branched or cyclic alkyl group having 3 to 10 carbon atoms. More specifically, the alkyl group having 1 to 20 carbon atoms may be a methyl group, an ethyl group, a n-propyl group, an iso-propyl group, an n-butyl group, an iso-butyl group, a tert-butyl group, an n-pentyl group, an iso-pentyl group, a neo-pentyl group, a cyclohexyl group, or the like.

The heterocycloalkyl group having 2 to 20 carbon atoms may be a cyclic alkyl group containing at least one atom other carbon exemplified as oxygen, nitrogen, sulfur or the like. Specifically, the heterocycloalkyl group having 2 to 20 carbon atoms may be a heterocycloalkyl group having 2 to 15 carbon atoms, a heterocycloalkyl group having 2 to 10 carbon atoms or a heterocycloalkyl group having 4 to 7 carbon atoms. More specifically, the heterocycloalkyl group having 2 to 20 carbon atoms may be an epoxy group, a tetrahydrofuranyl group, a tetrahydropyranyl group, a tetrahydrothiophenyl group, a tetrahydropyrrolyl group, or the like.

The alkoxy group having 1 to 20 carbon atoms may be a linear, branched or cyclic alkoxy group. Specifically, the alkoxy group having 1 to 20 carbon atoms may be a linear alkoxy group having 1 to 20 carbon atoms; a linear alkoxy group having 1 to 10 carbon atoms; a linear alkoxy group having 1 to 5 carbon atoms; a branched or cyclic alkoxy group having 3 to 20 carbon atoms; a branched or cyclic alkoxy group having 3 to 15 carbon atoms; or a branched or cyclic alkoxy group having 3 to 10 carbon atoms. More specifically, the alkoxy group having 1 to 20 carbon atoms may be a methoxy group, an ethoxy group, an n-propoxy group, an iso-propoxy group, a n-butoxy group, an iso-butoxy group, a tert-butoxy group, an n-pentoxy group, an iso-pentoxy group, a neo-pentoxy group, a cyclohectoxy group, or the like.

The alkoxyalkyl group having 2 to 20 carbon atoms may have a structure containing $—R^a—O—R^b$ and may be a substituent in which at least one hydrogen of the alkyl group ($—R^a$) is substituted with an alkoxy group ($—O—R^b$). Specifically, the alkoxyalkyl group having 2 to 20 carbon atoms may be a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, a tert-butoxyhexyl group, or the like.

The silyl group having 1 to 20 carbon atoms may be a substituent in which at least one hydrogen of $—SiH_3$ is substituted with an alkyl group or an alkoxy group. Specifically, the silyl group having 1 to 20 carbon atoms may be a methylsilyl group, a dimethylsilyl group, a trimethylsilyl group, a dimethylethylsilyl group, a diethylmethylsilyl group, a dimethylpropylsilyl group, a methoxysilyl group, a dimethoxysilyl group, a trimethoxysilyl group, a dimethoxyethoxysilyl group, a diethoxymethylsilyl group, a dimethoxypropylsilyl group, or the like.

The silylalkyl group having 1 to 20 carbon atoms may be a substituent in which at least one hydrogen of the alkyl group is substituted with a silyl group. Specifically, the silylalkyl group having 1 to 20 carbon atoms may be a dimethoxypropylsilylmethyl group or the like.

The silyloxyalkyl group having 1 to 20 carbon atoms may be a substituent in which at least one hydrogen of the alkyl group is substituted with a silyloxy group. Specifically, the silyloxyalkyl group having 1 to 20 carbon atoms may be a dimethoxypropylsilyloxymethyl group or the like.

The alkenyl group having 2 to 20 carbon atoms may be a linear, branched or cyclic alkenyl group. Specifically, the alkenyl group having 2 to 20 carbon atoms may include a linear alkenyl group having 2 to carbon atoms, a linear alkenyl group having 2 to carbon atoms, a linear alkenyl group having 2 to 5 carbon atoms, a branched alkenyl group having 3 to 20 carbon atoms, a branched alkenyl group having 3 to 15 carbon atoms, a branched alkenyl group having 3 to 10 carbon atoms, a cyclic alkenyl group having 5 to 20 carbon atoms, or a cyclic alkenyl group having 5 to carbon atoms. More specifically, the alkenyl group having 2 to 20 carbon atoms may be an ethenyl group, a propenyl group, a butenyl group, a pentenyl group or a cyclohexenyl group.

The carboxylate having 1 to 20 carbon atoms may have a structure of —COOR$^c$, wherein R$^c$ is a hydrocarbyl group having 1 to 20 carbon atoms. The hydrocarbyl group may be a monovalent functional group in which a hydrogen atom is removed from the hydrocarbon, and may include an alkyl group, an aryl group, and the like. Specifically, the carboxylate having 1 to 20 carbon atoms may be a pivalate or the like.

The aryl group having 6 to 20 carbon atoms may mean a monocyclic, bicyclic or tricyclic aromatic hydrocarbon. In addition, the aryl group may be used as a word to include an aralkyl group in which at least one hydrogen of the alkyl group is substituted with an aryl group. Specifically, the aryl group having 6 to 20 carbon atoms may be a phenyl group, a naphthyl group, an anthracenyl group, a benzyl group or the like.

The heteroaryl group having 5 to 20 carbon atoms may be a cyclic aryl group including at least one atom other than carbon exemplified as oxygen, nitrogen, sulfur and the like. Specifically, the heteroaryl group having 5 to 20 carbon atoms may be a heteroaryl group having 5 to 15 carbon atoms or a heteroaryl group having 5 to 10 carbon atoms. More specifically, the heteroaryl group having 5 to 20 carbon atoms may be a furanyl group, a pyranyl group, a thiophenyl group, a pyrrolyl group or the like.

The sulfonate group having 1 to 20 carbon atoms may have the structure of —O—SO$_2$—R$^d$, wherein R$^d$ may be a hydrocarbyl group having 1 to 20 carbon atoms. Specifically, the sulfonate group having 1 to 20 carbon atoms may be a methane sulfonate group, a phenyl sulfonate group, or the like.

The sulfone group having 1 to 20 carbon atoms has the structure of —R$^{e'}$—SO$_2$—R$^{e''}$ wherein R$^{e'}$ and R$^{e''}$ are the same as or different from each other and each independently represent a hydrocarbyl group having 1 to 20 carbon atoms. Specifically, the sulfone group having 1 to 20 carbon atoms may be a methylsulfonylmethyl group, a methylsulfonylpropyl group, a methylsulfonylbutyl group, a phenylsulfonylpropyl group or the like.

Further, in the present specification, the phrase "one or more pairs of adjacent substituents are connected with each other to form a substituted or unsubstituted aliphatic or aromatic ring" means that one or more pairs of adjacent substituents among two adjacent substituents are connected with each other to form an aliphatic or aromatic ring, and the aliphatic or aromatic ring may be substituted by any substituent. For example, a pair of adjacent substituents R$_{36}$ and R$_{37}$ of Chemical Formula 2 may be connected with each other to form a substituted or unsubstituted aromatic ring, for example, a benzene ring, or a substituted or unsubstituted aliphatic ring, for example, a cyclohexane ring.

The above-mentioned substituents may be optionally substituted with one or more substituents selected from the group consisting of a hydroxyl group, a halogen, an alkyl group, a heterocycloalkyl group, an alkoxy group, an alkenyl group, a silyl group, a phosphine group, a phosphide group, a sulfonate group, a sulfone group, an aryl group, and a heteroaryl group within the range that exerts the same or similar effect as the intended effect.

The olefin polymer according to one embodiment of the present invention may have a structure in which an LCB is introduced into LLDPE by using a catalyst in which a first transition metal compound represented by Chemical Formula 1 and a second transition metal compound represented by Chemical Formula 2 are hybrid-supported at the time of production. Consequently, the haze parameter calculated by Equation 1 can satisfy the above-mentioned range, and thus the physical properties, processability and transparency can be exhibited at the same time. Therefore, according to another embodiment of the present invention, a hybrid supported catalyst useful for the production of the olefin polymer is provided.

Hereinafter, a hybrid supported catalyst that can be used for preparing an olefin polymer according to an embodiment of the present invention and a method for preparing an olefin polymer using the same will be described in more detail.

The hybrid supported catalyst that can be used in the preparation of the olefin polymer according to one embodiment of the present invention can include the first and second transition metal compounds; and a support that supports the transition metal compounds, and, optionally, further include a cocatalyst.

Specifically, the first transition metal compound represented by Chemical Formula 1 includes a cyclopentadienyl ligand and a tetrahydroindenyl ligand as mutually different ligands, and have a structure in which the different ligands are cross-linked via -T(Q$_1$)(Q$_2$)-, and M$_1$(X$_1$)(X$_2$) is present between the different ligands. When a first transition metal compound having such a specific structure is activated by an appropriate method and used as a catalyst for the polymerization reaction of olefins, an olefin polymer exhibiting high activity and having excellent processability and improved haze characteristic due to of introduction of LCB into LLDPE can be produced.

Specifically, in the structure of the first transition metal compound represented by Chemical Formula 1, the cyclopentadienyl ligand may affect, for example, the polymerization activity of the olefin monomer and the physical property of the olefin polymer. In particular, when R$_1$ to R$_4$ are each independently any one of an alkyl group having 1 to carbon atoms, an alkoxy group having 1 to 20 carbon atoms, and an alkenyl group having 2 to 20 carbon atoms, more specifically when they are an alkyl group having 1 to 6 carbon atoms such as a methyl group, an ethyl group, a propyl group and the like, the catalyst obtained from the transition metal compound of Chemical Formula 1 can exhibit higher activity in the olefin polymerization process, and provide an olefin polymer having desired physical properties.

Further, in the structure of the first transition metal compound represented by Chemical Formula 1, the tetrahydroindenyl ligand can control, for example, the degree of the steric hindrance effect depending on the type of the substituted functional group, thereby easily controlling the molecular weight of the olefin polymer prepared.

Specifically, when $R_5$ and $R_6$ in Chemical Formula 1 may be each independently any one of hydrogen, an alkyl group having 1 to 20 carbon atoms, an alkoxy group having 1 to 20 carbon atoms and an alkenyl group having 2 to 20 carbon atoms, further, when $R_7$ to $R_{14}$ are each independently any one of hydrogen, an alkyl group having 1 to 20 carbon atoms, an alkoxy group having 1 to 20 carbon atoms and an alkenyl group having 2 to 20 carbon atoms, or one or more pairs of adjacent substituents of $R_7$ to $R_{14}$ are connected with each other to form a substituted or unsubstituted aliphatic ring, more specifically, when in Chemical Formula 1 $R_5$ and $R_6$ are each independently any one of hydrogen, an alkyl group having 1 to 4 carbon atoms, an alkoxy group having 1 to 4 carbon atoms and an alkenyl group having 2 to 4 carbon atoms, or $R_7$ to $R_{14}$ are each independently any one of hydrogen, an alkyl group having 1 to 4 carbon atoms, an alkoxy group having 1 to 4 carbon atoms and an alkenyl group having 2 to 4 carbon atoms, or one or more pairs of adjacent substituents of $R_7$ to $R_{14}$ are connected with each other to form a substituted or unsubstituted aliphatic ring, the hybrid supported catalyst can provide an olefin polymer exhibiting excellent processability.

The cyclopentadienyl ligand and the tetrahydroindenyl ligand can be crosslinked via $-T_1(Q_1)(Q_2)-$ to exhibit excellent stability.

In order to more effectively ensure these effects, $Q_1$ and $Q_2$ may be each independently any one of an alkyl group having 1 to 20 carbon atoms, an aryl group having 6 to 20 carbon atoms, an alkylaryl group having 7 to 20 carbon atoms and an arylalkyl group having 7 to 20 carbon atoms. More specifically, $Q_1$ and $Q_2$ are the same as each other and is any one of an alkyl group having 1 to 10 carbon atoms such as a methyl group, an ethyl group, a propyl group or a butyl group; an aryl group having 1 to 12 carbon atoms such as a phenyl group; an alkylaryl group having 7 to 13 carbon atoms and an arylalkyl group having 7 to 13 carbon atoms such as a benzyl group. And T may be C or Si; or Si.

Meanwhile, $M_1(X_1)(X_2)$ exists between the crosslinked cyclopentadienyl ligand and the tetrahydroindenyl ligand, and $M_1(X_1)(X_2)$ may affect the storage stability of the metal complex.

In order to more effectively ensure these effects, $X_1$ and $X_2$ may be each independently any one of halogen, an alkyl group having 1 to 20 carbon atoms and an alkoxy group having 1 to 20 carbon atoms.

More specifically, $X_1$ and $X_2$ may be each independently F, Cl, Br or I. And $M_1$ may be Ti, Zr or Hf; Zr or Hf; or Zr.

As an example, the first transition metal compound capable of providing an olefin polymer having improved processability may include compounds represented by Chemical Formulas 1a and 1b below.

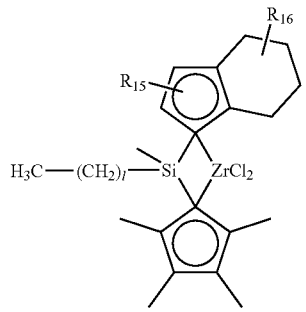

[Chemical Formula 1a]

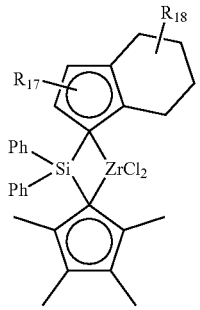

[Chemical Formula 1b]

in the above formulae 1a and 1b, $R_{15}$ to $R_{18}$ are the same as or different from each other, and each independently represent any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silyl alkyl group having 1 to 20 carbon atoms, an alkoxysilyl group having 1 to 20 carbon atoms, a silyloxyalkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, l is an integer between 0 and 5, and pH is a phenyl group.

In order to provide an olefin polymer having a superior processability, $R_{15}$ to $R_{19}$, which are substituents of the tetrahydroindenyl ligand in Chemical Formulas 1a and 1b, are each independently any one of hydrogen, an alkyl group having 1 to 10 carbon atoms, an alkoxy group having 1 to 10 carbon atoms, an alkenyl group having 2 to 10 carbon atoms and an aryl group having 6 to 12 carbon atoms; or any one of hydrogen, an alkyl group having 1 to 4 carbon atoms, an alkoxy group having 1 to 4 carbon atoms, an alkenyl group having 2 to 4 carbon atoms, and an aryl group having 6 to 12 carbon atoms.

The first transition metal compound represented by Chemical Formula 1 may be synthesized by applying reactions known in the art. Specifically, the first transition metal compound can be prepared by connecting a tetrahydroindenyl derivative and a cyclopentadienyl ligand via a bridging compound to prepare a ligand compound, and then introducing a metal precursor compound therein to perform a metalation, but not limited thereto. For more detailed synthesis method, reference can be made to examples described later.

The second transition metal compound represented by Chemical Formula 2 has an asymmetric structure including a cyclopentadienyl ligand and a fluorenyl ligand, and the cyclopentadienyl ligand and the fluorenyl ligand are cross-linked via $T_2$ and has a structure in which $M_2(X_1)(X_2)$ is present between the different ligands. As a second transition metal compound having such a specific structure is supported and used on the support together with the first transition metal compound represented by Chemical Formula 1, an olefin polymer exhibiting higher activity and having improved haze characteristics together with excellent processability due to the introduction of LCB into LLDPE can be produced.

Further, in the structure of the second transition metal compound represented by Chemical Formula 2, the cyclopentadienyl ligand may affect, for example, the polymerization activity of the olefin monomer and the physical property of the olefin polymer. In particular, when $R_{21}$ to $R_{24}$ are each independently any one of an alkyl group having 1 to 20 carbon atoms, an alkoxy group having 1 to 20 carbon atoms, and an alkenyl group having 2 to 20 carbon atoms, it is possible to exhibit more excellent catalytic activity.

In the second transition metal compound, at least one of $R_{21}$ to $R_{24}$ in the cyclopentadienyl group may be an alkoxyalkyl group having 2 to 20 carbon atoms, and the remaining functional group may be hydrogen. More specifically, by introducing a substituent of —$(CH_2)_n$—OR (wherein R is a linear or branched alkyl group having 1 to 6 carbon atoms, n is an integer of 1 to 10, more specifically an integer of 1 to 6, still more specifically an integer of 4 to 6) into a cyclopentadienyl group, it is possible to produce a polyolefin in which the degree of copolymerization or the comonomer distribution is controlled, compared to other cyclopentadienyl ligand-based catalysts which do not contain such a substituent at the time of producing polyolefins using comonomers. Further, when the first transition metal compound having the above structure is supported on a support, the —$(CH_2)_n$—OR group in the substituent can form a covalent bond through a close interaction with a silanol group on the surface of the silica used as the support, and thereby a stable supported polymerization is made possible. More specifically, at least one of $R_{21}$ to $R_{24}$ may be a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, and tert-butoxyhexyl group.

Moreover, in the structure of the second transition metal compound represented by Chemical Formula 2, the fluorenyl ligand can control the degree of steric hindrance effect depending on the type of the substituted functional group, thereby easily controlling the molecular weight of the olefin polymer prepared.

Specifically, in Chemical Formula 2, when $R_{31}$ to $R_{38}$ are the same as or different from each other, and each independently represent any one of hydrogen, an alkyl group having 1 to 10 carbon atoms, an alkoxy group having 1 to 10 carbon atoms, an alkoxyalkyl group having 2 to 10 carbon atoms, an alkylsilyl group having 1 to 10 carbon atoms, an silyalkyl group having 1 to 10 carbon atoms, a silyloxyalkyl group having 1 to 10 carbon atoms, an alkenyl group having 2 to 10 carbon atoms, and an aryl group having 6 to 12 carbon atoms, or one or more pairs of adjacent substituents of $R_{31}$ to $R_{38}$ are connected with each other to form a substituted or unsubstituted aliphatic or aromatic ring, more specifically, when $R_{31}$ to $R_{38}$ are the same as or different from each other, and each independently represent an alkyl group having 1 to 4 carbon atoms such as a methyl group, an ethyl group, a propyl group, a t-butyl group or the like, the hybrid supported catalyst can provide an olefin polymer having excellent processability.

In addition, the cyclopentadienyl ligand and the fluorenyl ligand can be cross-linked via -$T_2$- to exhibit excellent stability.

The $T_2$ may be any one of $T_3(Q_3)$ $(Q_4)$ and an alkylene group having 2 to 5 carbon atoms, wherein the $T_3$ is C, Si, Ge, Sn or Pb, $Q_3$ and $Q_4$ are the same as or different from each other and each independently represent any one of an alkyl group having 1 to 10 carbon atoms, an alkoxy group having 1 to 10 carbon atoms, an alkoxyalkyl group having 2 to carbon atoms, and an aryl group having 6 to 12 carbon atoms, or are connected with each other to form a substituted or unsubstituted aliphatic hydrocarbon ring having 3 to 12 carbon atoms or aromatic hydrocarbon ring having 6 to 12 carbon atoms. In order to more effectively ensure these effects, the $T_3$ is C, Q; and $Q_4$ are the same as or different from each other and each independently represent an alkyl group having 1 to 10 carbon atoms, or are connected with each other to form a cycloalkyl group having 3 to 12 carbon atoms or an aryl group having 6 to 12 carbon atoms. More concretely, $Q_3$ and $Q_4$ are the same as each other and are any one of a methyl group, an ethyl group, an n-propyl group and an n-butyl group, or are connected with each other to form a cyclohexyl group.

Meanwhile, $M_2$ $(X_3)(X_4)$ exists between the crosslinked cyclopentadienyl ligand and the fluorenyl ligand, and $M_2(X_3)(X_4)$ may affect the storage stability of the metal complex.

In order to more effectively ensure this effect, $X_3$ and $X_4$ may be each independently any one of a halogen, an alkyl group having 1 to 20 carbon atoms and an alkoxy group having 1 to 20 carbon atoms. More specifically, $X_3$ and $X_4$ may be each independently F, Cl, Br or I. And $M_2$ may be Ti, Zr or Hf; or Zr or Hf; or Zr.

As an example, as a second transition metal compound capable of providing an olefin polymer having more increased processability, there may be mentioned the compound represented by the following structural formulas, and any one or a mixture of two or more thereof may be used:

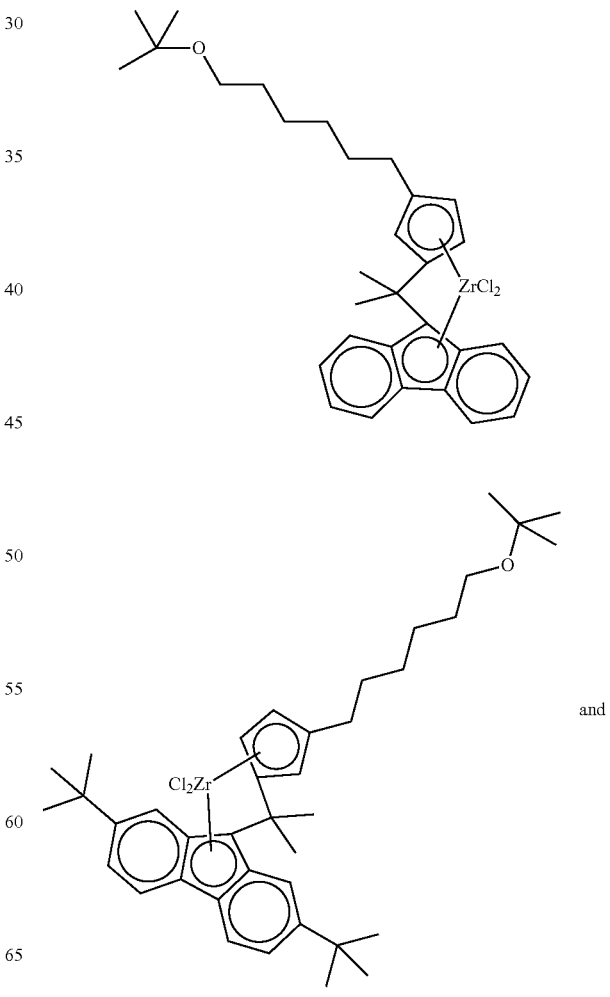

and

-continued

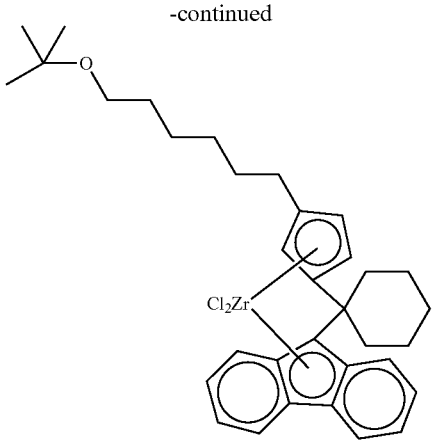

The second transition metal compound represented by Chemical Formula 2 may be synthesized by applying reactions known in the art. For more detailed synthesis method, reference can be made to examples described later.

Meanwhile, the first and second transition metal compounds have the above-described structural characteristics and thus can be stably supported on the support.

As the support, a support containing a hydroxy group or a siloxane group on its surface can be used. Specifically, a support containing a hydroxy group or a siloxane group having high reactivity can be used as the support by drying it at high temperature to remove moisture on its surface. More specifically, silica, alumina, magnesia, a mixture thereof, or the like can be used as the support. Of these, silica may be more preferable. The support may be one which has been dried at high temperatures and these may typically include oxides, carbonates, sulphates and nitrate components such as $Na_2O$, $K_2CO_3$, $BaSO_4$ and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

Further, the hybrid supported catalyst according to one embodiment of the invention may further include a cocatalyst in order to activate the transition metal compound which is a catalyst precursor. The cocatalyst is an organometallic compound containing a Group 13 metal and is not particularly limited as long as it can be used in the polymerization of olefins in the presence of a general metallocene catalyst. Specifically, the cocatalyst may be one or more compounds selected from the group consisting of the compounds represented by Chemical Formulas 3 to 5 below.

$$R_{41}-[Al(R_{42})-O]_n-R_{43}$$ [Chemical Formula 3]

in the above formula 3,
$R_{41}$, $R_{42}$ and $R_{43}$ are each independently any one of hydrogen, a halogen, a hydrocarbyl group having 1 to 20 carbon atoms and a hydrocarbyl group having 1 to 20 carbon atoms substituted with a halogen, and
n is an integer of 2 or more, $$D(R_{44})_3$$ [Chemical Formula 4]

in the above formula 4,
D is aluminum or boron,
each $R_{44}$ is each independently any one of a halogen, a hydrocarbyl group having 1 to 20 carbon atoms, and a hydrocarbyl group having 1 to 20 carbon atoms substituted with a halogen, $$[L-H]^+[Z(A)_4]^- \text{ or } [L]^+[Z(A)_4]^-$$ [Chemical Formula 5]

in the above formula 5,
L is a neutral or cationic Lewis base, H is a hydrogen atom,
Z is a Group 13 element, and each A is independently any one of a hydrocarbyl group having 1 to 20 carbon atoms; a hydrocarbyloxy group having 1 to 20 carbon atoms; and substituents in which at least one hydrogen atom of the above substituents is substituted with at least one substituent of halogen, a hydrocarbyloxy group having 1 to 20 carbon atoms and a hydrocarbylsilyl group having 1 to 20 carbon atoms.

Non-limiting examples of the compound represented by Chemical Formula 3 include methyl aluminoxane, ethyl aluminoxane, isobutyl aluminoxane, tert-butyl aluminoxane, and the like, and non-limiting examples of the compound represented by Chemical Formula 4 include trimethyl aluminum, triethyl aluminum, triisobutyl aluminum, tripropyl aluminum, tributyl aluminum, dimethylchloro aluminum, triisopropyl aluminum, tri-sec-butylaluminium, tricyclopentyl aluminium, triphentylaluminum, triisopentyl aluminum, trihexyl aluminum, trioctyl aluminum, ethyl dimethyl aluminum, methyl diethyl aluminum, triphenyl aluminum, tri-p-tolyl aluminum, dimethyl aluminum methoxide, dimethyl aluminum ethoxide or the like. Finally, non-limiting examples of the compound represented by Chemical Formula 5 include trimethylammonium tetrakis(pentafluorophenyl) borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl) borate, N,N-dimethylanilinium tetrakis(4-(triisopropylsilyl)-2,3,5,6-tetrafluorophenyl)borate, N,N-dimethylanilinium pentafluorophenoxy tris(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecyl anilinium tetrakis(pentafluorophenyl)borate, methyldi(dodecyl)ammonium tetrakis(pentafluorophenyl) borate, and the like.

The cocatalyst can be used in an appropriate amount so that the activation of the transition metal compound can sufficiently proceed Such hybrid supported catalyst can be prepared, for example, by a method comprising the steps of supporting a cocatalyst on a support and supporting the first and second transition metal compounds as the catalyst precursor on the cocatalyst-supported support.

Specifically, in the step of supporting the cocatalyst on the support, a cocatalyst-supported support may be prepared by adding a cocatalyst to a support dried at a high temperature and stirring the resultant at a temperature of about 20 to 120° C.

Further, in the step of supporting the catalyst precursor on the cocatalyst-supported support, a supported catalyst can be prepared by adding a transition metal compound to the cocatalyst-supported support obtained in the step of supporting the cocatalyst on the support, and then stirring the resultant at a temperature of about 20° C. to 120° C.

In the step of supporting a transition precursor on the cocatalyst-supported support, a supported catalyst can be prepared by adding a transition metal compound to the cocatalyst-supported support, stirring the resultant and then further adding a cocatalyst thereto.

The content of the support, the cocatalyst, the cocatalyst-supported support and the transition metal compound used in the hybrid supported catalyst according to one embodiment of the present invention can be appropriately controlled according to the desired physical properties and effects of the supported catalyst.

Specifically, in the hybrid supported catalyst according to one embodiment of the present invention, the mixing weight ratio of the first transition metal compound and the second transition metal compound may be 50:1 to 1:1, more specifically 20:1 to 1:1. By including the first and second transition metal compounds at the above mixing weight ratio, the length and number of the long chain branch can be controlled and the melt strength is increased without increasing the molecular weight distribution, and thereby, the olefin polymer having excellent bubble stability and blown film processability can be more easily prepared.

Further, in the hybrid supported catalyst according to one embodiment of the present invention, a weight ratio of the total transition metal compounds including the first and second transition metal compounds to the support may be 1:10 to 1:1,000, more specifically 1:10 to 1:500. When including the support and the metallocene compound at the above weight ratio, an optimal shape may be obtained.

Further, when the hybrid supported catalyst further includes a cocatalyst, a weight ratio of the cocatalyst to the support may be 1:1 to 1:100, more specifically 1:1 to 1:50. When including the cocatalyst and the support at the above weight ratio, the activity and microstructure may be optimized.

As a reaction solvent used in the preparation of the hybrid supported catalyst, a hydrocarbon solvent such as pentane, hexane, heptane, etc., or an aromatic solvent such as benzene, toluene, etc. may be used.

For detailed preparation method of the supported catalyst, reference can be made to examples described later. However, the method for preparing the supported catalyst is not limited to the contents described in the present specification, and the preparation method can further adopt the steps commonly employed in the technical field to which the present invention belongs. The step(s) of the preparation method described above can be typically modified by a changeable step(s).

Meanwhile, examples of the olefin monomer that can be polymerized by the hybrid supported catalyst includes ethylene, alpha-olefin, cyclic olefin, or the like, and diene olefin monomers or triene olefin monomers having two or more double bonds can also be polymerized. Specific examples of the monomers may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, etc., and these monomers may be copolymerized by mixing two or more thereof. When the olefin polymer is a copolymer of ethylene and another comonomer, the comonomer is preferably at least one comonomer selected from the group consisting of propylene, 1-butene, 1-hexene, 4-methyl-1-pentene and 1-octene.

For the polymerization reaction of the above olefin monomer, various polymerization processes that are known as a polymerization reaction of olefin monomer such as a continuous solution polymerization process, a bulk polymerization process, a suspension polymerization process, a slurry polymerization process, or an emulsion polymerization process can be employed.

Specifically, the polymerization reaction may be carried out at a temperature of about 50° C. to 110° C. or about 60° C. to 100° C. and a pressure of about 1 to 100 kgf/cm$^2$ or about 1 to 50 kgf/cm$^2$.

Further, in the polymerization reaction, the hybrid supported catalyst may be used in a state of being dissolved or diluted in a solvent such as pentane, hexane, heptane, nonane, decane, toluene, benzene, dichloromethane, chlorobenzene or the like. At this time, by treating the solvent with a small amount of alkyl aluminum or the like, a small amount of water, air or the like which can adversely affect the catalyst can be removed beforehand.

According to the above-mentioned production method, an olefin polymer according to one embodiment of the invention having the physical properties describe above can be produced.

The olefin polymer according to one embodiment of the invention having the physical properties described above has a melt strength without increasing the molecular weight distribution as compared with a polyolefin polymerized using a conventional transition metal compound catalyst, and thus has excellent bubble stability and processing load characteristics, and exhibits excellent processability during production of a film, and further has excellent mechanical properties. Further, as the condition of the haze parameter described above is satisfied via the control of the initial storage modulus, it is possible to minimize the surface irregularities at the time of producing the film, and as a result, the transparency of the film is greatly improved. Accordingly, it can be usefully applied to various fields requiring excellent mechanical properties, processability, and transparency. In particular, the olefin polymer has excellent bubble stability and can stably form a blown film by a melt-blowing process or the like. Specifically, the olefin polymer according to one embodiment of the invention. Specifically, the olefin polymer according to one embodiment of the present invention can stably provide a blown film even when the blow-up ratio (BUR) is adjusted to 2.7 or more as described in Test Examples described later.

Further, due to the effect of improving the transparency of the olefin polymer, a high transparency film, especially a blown film, having a haze value measured according to ISO 14782 of 10% or less, more specifically more than 0% and 10% or less, still more specifically more than 0% and 9.5% or less can be provided.

The actions and effects of the invention will be described in more detail by way of concrete examples below. However, these examples are presented for illustrative purposes only and the scope of the invention is not limited thereto in any way.

Synthesis Example 1: Preparation of Transition Metal Compound (Metallocene Catalyst Precursor A)

TMCP-Li (1.3 g, 10 mmol), CuCN (45 mg, 5 mol %) and THF (10 mL). was added to a dried 250 mL schlenk flask. Then, the temperature of the flask was cooled down to −20° C. or less, and then dichlorodiphenylsilane (2.5 g, 10 mmol) was added dropwise, and the obtained mixture was stirred at room temperature for 16 hours. Next, the temperature of the flask was cooled down to −20° C. or less, and then an indene-lithiation solution (1.2 g, 10 mmol in 10 mL of THF) was added dropwise, and the obtained mixture was stirred at room temperature for 24 hours. Subsequently, the obtained mixture was dried under reduced pressure to remove the solvent from the solution. Then, the obtained solid was dissolved in hexane and filtered to remove residual LiCl, which was then dried under vacuum to remove hexane from the filtrate, thereby obtaining diphenyl(indenyl) (tetramethylcyclopentadienyl)silane.

Diphenyl(indenyl) (tetramethylcyclopentadienyl)silane (4.2 g, 10 mmol) previously synthesized was dissolved in THF (15 mL) in a 100 mL schlenk flask. After cooling the solution to −20° C. or lower, n-BuLi (2.5 M in hexane, 8.4 mL, 21 mmol) was slowly added dropwise to the above solution, and the resulting solution was stirred at room temperature for 6 hours.

Meanwhile, $ZrCl_4(THF)_2$ (3.8 g, 10 mmol) was dispersed in toluene (15 mL) in a separately prepared 250 mL schlenk flask, and the obtained mixture was stirred at −20° C. Then, the lithiated ligand solution previously prepared was slowed added to the mixture. The mixture thus obtained was stirred at room temperature for 48 hours.

Subsequently, the obtained solution was dried under reduced pressure to remove the solvent from the solution. The resulting solid was dissolved in dichloromethane (DCM) and filtered to remove residual LiCl, and the filtrate was dried under vacuum to remove DCM. Then, the obtained solid was added to 30 mL of toluene, and the mixture was stirred for 16 hours and then filtered to obtain diphenylsilylene (tetramethylcyclopentadienyl) (indenyl) zirconium dichloride (2.1 g, 3.6 mmol) in the form of a lemon-colored solid (36% yield).

$^1$H NMR (500 MHz, $CDCl_3$): 8.08-8.12 (2H, m), 7.98-8.05 (2H, m), 7.77 (1H, d), 7.47-7.53 (3H, m), 7.42-7.46 (3H, m), 7.37-7.41 (2H, m), 6.94 (1H, t), 6.23 (1H, d), 1.98 (3H, s), 1.95 (3H, s), 1.68 (3H, s), 1.52 (3H, s).

The previously synthesized diphenylsilylene (tetramethylcyclopentadienyl) (indenyl) zirconium dichloride (1.0 g, 1.7 mmol), Pd/C (5 mol %), and DCM (30 mL) were added to a 100 mL high-pressure reactor and filled with hydrogen to a pressure of about 20 bar. Next, the mixture contained in the high-pressure reactor was stirred at about 35° C. for about 24 hours. Upon completion of the reaction, the reaction product was passed through a celite pad to remove the solid from the reaction product, thereby obtaining diphenylsilylene (tetramethylcyclopentadienyl) (tetrahydroindenyl) zirconium dichloride (hereinafter, referred to as "metallocene catalyst precursor A") (0.65 g, 1.1 mmol, 65% yield).

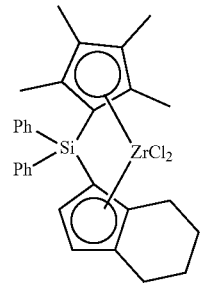

(A)

$^1$H NMR ($CDCl_3$, 7.26 ppm): 7.94 (4H, d), 7.42-7.38 (6H, m), 6.79 (1H, d), 5.70 (1H, d), 3.11 (1H, m), 2.80 (1H, m), 2.56 (1H, m), 2.12 (3H, s), 2.06 (1H, m), 2.03 (3H, m), 1.99 (1H, m), 1.76 (3H, s), 1.72 (1H, m), 1.58 (2H, m), 1.48 (3H, s)

Synthesis Example 2: Preparation of Transition Metal Compound (Metallocene Catalyst Precursor B)

10.78 g (48.5 mmol) of 2-(6-tert-butoxyhexyl)cyclopenta-1,3-diene was added to a dried 250 mL schlenk flask, to which 50 mL of methanol and 7.1 mL of acetone were added and then cooled down to 0° C. 50 mL of water and acetic acid was added dropwise thereto, and the mixture was stirred for 30 minutes and worked up with ether. The organic layer was separated and dried over $MgSO_4$. Thereby, 2-(6-tert-butoxyhexyl)-5-(propan-2-ylidene)cyclopenta-1,3-diene (8.2 g, 31.25 mmol, 64.4%) was produced.

1.6621 g (10 mmol) of fluorene was prepared in a dried 250 mL schlenk flask and dissolved in 40 mL of ether. The resultant solution was cooled down to 0° C., and then 4.8 mL (12 mmol) of 2.5M n-BuLi hexane solution was added dropwise, and the mixture was warmed up to room temperature and stirred for 1 day. To the lithiated fluorene mixture thus obtained was added dropwise a solution prepared by dissolving 2.6243 g (10 mmol) of the previously prepared 2-(6-tert-butoxyhexyl)-5-(propan-2-ylidene)cyclopenta-1,3-diene in THF, and the mixture was stirred for 1 day. 50 mL of water was added thereto and quenched. The organic layer was separated and dried over $MgSO_4$ to obtain 4.3 g (10.02 mmol, 100.2%) of the ligand compound.

NMR standard purity (wt %)=100%, Mw=428.65

$^1$H NMR (500 MHz, $CDCl_3$): 0.98 (6H, m), 1.14 (9H, s), 1.39 (5H, m), 1.54 (5H, m), 2.93, 3.03 (1H, s), 3.29 (2H, m), 4.07 (1H, m), 5.67, 5.98, 6.08, 6.51 (total 3H, s), 7.10 (3H, m), 7.31 (3H, m), 7.78 (2H, d).

The ligand compound synthesized above was added to a 250 mL schlenk flask dried in an oven and dissolved in 4 equivalents of MTBE and toluene, and then 2.1 equivalents of n-BuLi hexane solution was added thereto, and then subjected to lithiation for 24 hours. 2.1 equivalents of $ZrCl_4(THF)_2$ was taken in a glove box and added to a 250 mL schlenk flask to which ether was added to prepare a suspension. The above two flasks were cooled down to −78° C. and ligand anion was slowly added to the Zr suspension. After the addition was completed, the resultant reaction mixture was slowly warmed up to room temperature, stirred overnight, and the resulting reaction was subjected to vacuum-reduced pressure to remove 4 equivalents of MTBE. The toluene solution was then filtered under argon and the filtered solid filter cake LiCl was removed. The toluene remaining in the filtrate was removed through vacuum-reduced pressure and hexane of volume equivalent to the previous solvent was added thereto. The mixture was filtered under argon, and both the filtered solid was subjected to vacuum-reduced pressure to evaporate a solvent. The remaining filter cake and filtrate were confirmed through NMR whether to synthesize a catalyst, respectively, and then weighed in glove box and sampled to confirm the yield and purity. As a result, 3.45 g (5.86 mmol, 58.6% yield) of filter cake as a pink solid catalyst (hereinafter, referred to as "metallocene catalyst precursor B") was obtained.

(B)

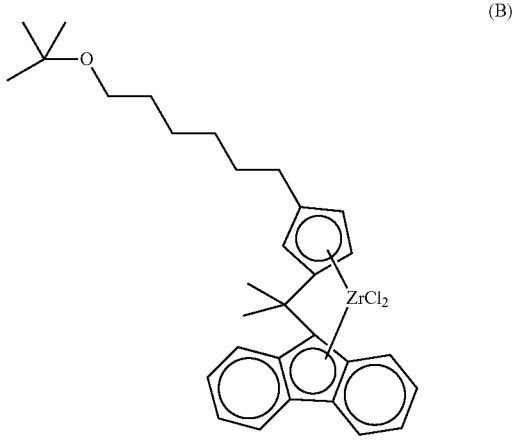

NMR standard purity (wt %)=100%, Mw: 588.86 $^1$H NMR (500 MHz, CDCl$_3$): 0.17 (9H, s), 1.26 (5H, m), 1.45 (5H, m), 2.35 (3H, s), 2.37 (3H, s), 3.27 (2H, m), 5.43 (1H, m), 5.67 (1H, m), 6.00 (1H, m), 7.26 (2H, m), 7.54 (2H, q), 7.99-7.85 (2H, dd), 8.15 (2H, m)

Synthesis Example 3: Preparation of Transition Metal Compound (Metallocene Catalyst Precursor C)

Tetramethylcyclopentadiene (TMCP, 6.0 mL, 40 mmol) was dissolved in THF (60 mL) in a dried 250 mL schlenk flask, and then this solution was cooled down to −78° C. Then, n-BuLi (2.5 M, 17 mL, 42 mmol) was slowly added dropwise to the above solution, and the obtained solution was stirred at room temperature overnight.

Meanwhile, dichlorodimethylsilane (4.8 mL, 40 mmol) was dissolved in n-hexane in another 250 mL schlenk flask, and then this solution cooled down to −78° C. Then, the TMCP-lithiation ligand solution previously prepared was slowly added to the mixture. The mixture thus obtained was stirred at room temperature overnight.

Subsequently, the obtained solution was subjected to reduced pressure to remove the solvent from the solution. The resulting solid was dissolved in toluene and filtered to remove residual LiCl, thereby obtaining an intermediate (yellow liquid, 7.0 g, 33 mmol, 83% yield).

$^1$H NMR (500 MHz, CDCl$_3$): 0.24 (6H, s), 1.82 (6H, s), 1.98 (6H, s), 3.08 (1H, s).

Indene (0.93 mL, 8.0 mmol) was dissolved in THF (30 mL) in a dried 250 mL schlenk flask and then the solution was cooled down to −78° C. Then, n-BuLi (2.5 M, 3.4 mL, 8.4 mmol) was slowly added dropwise to the solution, and the obtained solution was stirred at room temperature for about 5 hours.

Meantime, the previously synthesized intermediate (1.7 g, 8.0 mmol) was dissolved in THF in another 250 mL schlenk flask, and the solution was cooled down to −78° C. Then, the indene-lithiation solution previously prepared was slowly added to this solution. The obtained solution was stirred at room temperature overnight to obtain a purple solution.

Subsequently, water was poured into the reactor to quench the reaction, and the organic layer was extracted from the mixture with ether. It was confirmed through $^1$H NMR that dimethyl(indenyl) (tetramethylcyclopentadienyl)silane and another type of organic compounds were contained in the organic layer. The organic layer was concentrated without purification and used directly for metalation.

The previously synthesized dimethyl (indenyl) (tetramethylcyclopentadienyl) silane (1.7 g, 5.7 mmol) was dissolved in toluene (30 mL) and MTBE (3.0 mL) in a 250 mL schlenk flask. This solution was then cooled down to −78° C., and then n-BuLi (2.5 M, 4.8 mL, 12 mmol) was slowly added dropwise to the solution. The obtained solution was stirred at room temperature overnight. However, yellow solids were formed in the solution and were not stirred uniformly, and thus MTBE (50 mL) and THF (38 mL) were further added.

Meanwhile, in a separately prepared 250 mL schlenk flask, ZrCl$_4$(THF)$_2$ was dispersed in toluene, and then the obtained mixture was cooled down to −78° C. Then, the lithiated ligand solution previously prepared was slowly added to the mixture. The obtained mixture was then stirred overnight.

Subsequently, the reaction product was filtered to obtain dimethylsilylene(tetramethylcyclopentadienyl) (indenyl)zirconium dichloride (1.3 g, containing LiCl (0.48 g), 1.8 mmol) in the form of yellow solid. The solvent was removed from the filtrate and washed with n-hexane to obtain an additional yellow solid (320 mg, 0.70 mmol) (total 44% yield).

$^1$H NMR (500 MHz, CDCl$_3$): 0.96 (3H, s), 1.16 (3H, s), 1.91 (3H, s), 1.93 (3H, s), 1.96 (3H, s), 1.97 (3H, s), 5.98 (1H, d), 7.07 (1H, t), 7.23 (1H, d), 7.35 (1H, t), 7.49 (1H, d), 7.70 (1H, d).

The previously synthesized dimethylsilylene (tetramethylcyclopentadienyl) (indenyl) zirconium dichloride (1.049 g, 2.3 mmol) was put into a mini-bomb in a glove box. Then, platinum oxide (52.4 mg, 0.231 mmol) was further put into the mini bombe. After the mini bombe was assembled, anhydrous THF (30 mL) was added via cannula to the mini bombe, and filled with hydrogen up to a pressure of about 30 bar. Subsequently, the mixture put in the mini bombe was stirred at about 60° C. for about 1 day. Then, the temperature of the mini bombe was cooled to room temperature, and hydrogen was replaced with argon while gradually lowering the pressure of the mini bombe.

Meanwhile, celite dried in an oven at about 120° C. for about 2 hours was laid on a schlenk filter, and the reaction product of the mini bombe was filtered under argon. The PtO$_2$ catalyst was removed from the reaction product through a celite. Subsequently, the catalyst-removed reaction product was subjected to reduced pressure to remove the solvent, and thereby dimethylsilylene (tetramethylcyclopentadienyl) (tetrahydroindenyl)zirconium dichloride was obtained as a pale yellow solid (hereinafter, referred to as "metallocene catalyst precursor C") (0.601 g, 1.31 mmol, Mw: 458.65 g/mol).

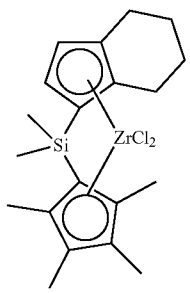

(C)

<sup>1</sup>H NMR (500 MHz, CDCl$_3$): 0.82 (3H, s), 0.88 (3H, s), 1.92 (6H, s), 1.99 (3H, s), 2.05 (3H, s), 2.34 (2H, m), 2.54 (2H, m), 2.68 (2H, m), 3.03 (2H, m), 5.45 (1H, s), 6.67 (1H, s).

Synthesis Example 5: Preparation of Transition Metal Compound (Metallocene Catalyst Precursor D)

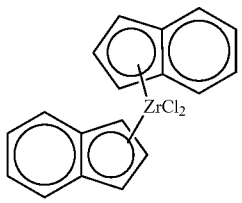

(D)

A metallocene compound of the above structural formula was prepared (purchased from Strem, Cas Number 12148-49-1).

Synthesis Example 6: Preparation of Transition Metal Compound (Metallocene Catalyst Precursor E)

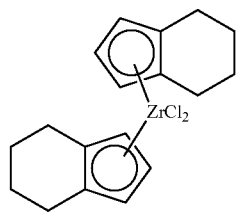

(E)

The compound (E) was synthesized by referring to the method described in Angew. Chem. Int. Ed (2008), 7, 6073.

Specifically, the metallocene catalyst precursor D, bis(indenyl)zirconium dichloride (CAS Number: 12148-49-1, manufactured by Strem) (2.0 g, 5.1 mmol), PtO$_2$ (0.08 g) and DCM 40 mL) were put into a 100 mL high-pressure reactor and filled with hydrogen up to a pressure of about 60 bar. Then, the mixture put in the high-pressure reactor was stirred at room temperature for about 24 hours. Upon completion of the reaction, the reaction product was passed through a celite pad to remove the solid from the reaction product, thereby obtaining bis(tetrahydroindenyl) zirconium dichloride (hereinafter, referred to as "metallocene catalyst precursor E") (1.4 g, 3.5 mmol, 69% yield)

Synthesis Example 7: Preparation of Transition Metal Compound (Metallocene Catalyst Precursor F)

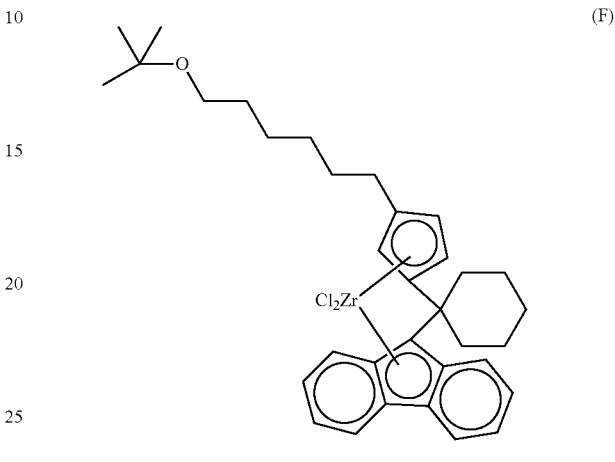

(F)

1.66 g (10 mmol) of fluorine and 30 ml of THF were added to a 250 ml schlenk flask dried under argon. The resultant solution was cooled down to 0° C., and then 4.8 ml (12 mmol) of a 2.5 M n-BuLi hexane solution was added thereto. The temperature of the resultant reaction mixture was slowly raised to room temperature and then stirred for 24 hours. 3.025 g (10 mmol) of 3-(6-tert-butoxyhexyl)cyclopenta-2,4-dienylidene)cyclohexane was prepared in another 250 ml schlenk flask and was dissolved in THF, and then the mixture was added dropwise to the lithiated fluorene and then stirred at room temperature for 1 day. 50 ml of water was added to the flask, quenched and worked up with ether. The organic layer was separated and then dried over MgSO$_4$. Thereby, 4.68 g of the ligand compound was obtained (10 mmol in quantitative yield).

<sup>1</sup>H NMR (500 MHz, CDCl$_3$): 1.17-1.20 (9H, m), 1.31-1.55 (12H, m), 1.84 (2H, m), 2.37 (2H, m), 3.34 (2H, m), 3.75 (1H, m), 3.93 (1H, s), 5.63 (1H, s), 5.63-5.92 (total 1H, s), 6.09 (1H, s), 7.13-7.16 (2H, m), 7.29-7.38 (4H, m), 7.62 (1H, m), 7.80 (1H, m).

4.68 g of the ligand compound synthesized above was added to the oven-dried 250 mL schlenk flask and dissolved in 40 mL of ether. 2.5 equivalents of n-BuLi hexane solution was added to the resultant solution and subjected to lithiation for 24 hours. 1.0 equivalent of ZrCl$_4$(THF)$_2$ was taken in a glove box and put in a 250 mL schlenk flask and ether was added to prepare a suspension. The above two flasks were cooled down to −78° C. and ligand anion was slowly added to the Zr suspension. After the addition was completed, the resulting reaction mixture was slowly warmed up to room temperature and stirred for 24 hours. Then, the resulting reactants were filtered and the filtered solid filter cake LiCl was removed. The solvent remaining in the filtrate was removed through vacuum-reduced pressure and hexane of volume equivalent to the previous solvent was added thereto, and recrystallized to obtain a second filter cake. This was completely dried under vacuum-reduced pressure and was confirmed through NMR whether to synthesize a catalyst, weighed in a glove box and sampled to confirm the yield and purity. Thereby, of 3.24 g (5.1 mmol, 51% yield)

of a red solid catalyst (hereinafter referred to as "metallocene catalyst precursor F") was obtained.

¹H NMR (500 MHz, CDCl₃): 1.08 (9H, s), 1.19-1.21 (4H, m), 1.37-1.40 (4H, m), 1.59-1.64 (1H, m), 1.75-1.77 (1H, m), 1.86-1.91 (4H, m), 2.23-2.27 (2H, m), 2.28-2.32 (2H, m), 3.18-3.19 (2H, m), 3.20 (2H, m), 5.34 (1H, s), 5.59 (1H, s), 5.93 (1H, s), 7.18-7.22 (2H, m), 7.45-7.50 (2H, m), 7.64-7.71 (2H, d), 8.09-8.10 (2H, m).

Preparation Example 1: Preparation of Supported Catalyst 3.0 kg of toluene and 900 g of silica (Grace Davison, SP952, calcined at 250° C.) were added to a 20 L high-pressure reactor and stirred while raising the reactor temperature to 40° C. 2.6 kg of 30 wt % methylaluminoxane (MAO)/toluene solution (manufactured by Albemarle) was added to the reactor. After raising the temperature to 80° C., the mixture was stirred at about 200 rpm for about 12 hours.

After the temperature of the reactor was lowered to 40° C., stirring was stopped, and the reaction solution was allowed to settle for 30 minutes and decanted. 3.0 kg of toluene was added to the reactor, and 50 g of the catalyst precursor A prepared in Synthesis Example 1 and 6.0 g of the catalyst precursor B prepared in Synthesis Example 2 were dissolved in 1.0 kg of toluene and put into the reactor, and then stirred at 200 rpm for 90 minutes. After the reactor temperature was lowered to room temperature, stirring was stopped, and the reaction solution was allowed to settle for 30 minutes and decanted. After 3.0 kg of hexane was added to the reactor, the resulting slurry was dried with a 20 L high pressure filer dryer and the hexane solution was filtered. The filtrate was dried under reduced pressure at 50° C. for 4 hours to obtain 1310 g of the supported catalyst.

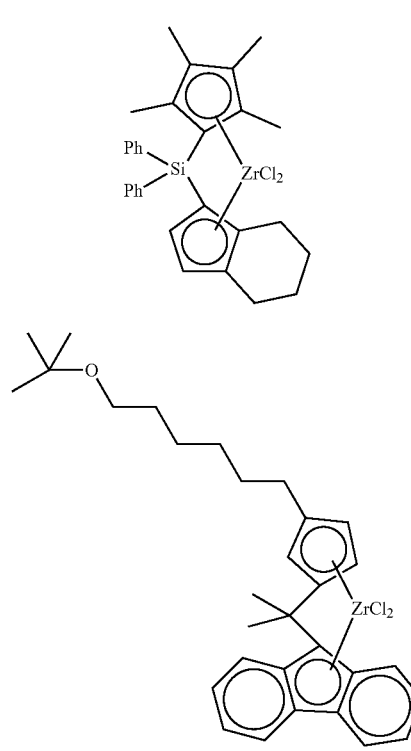

Preparation Example 2: Preparation of Supported Catalyst 4.0 kg of toluene and 800 g of silica (Grace Davison, SP2410) were added to a 10 L high-pressure reactor and stirred while raising the reactor temperature to 40° C. 1.5 kg of 30 wt % methylaluminoxane (MAO)/toluene solution (manufactured by Albemarle) was added to the reactor. After raising the temperature to 80° C., the mixture was stirred at about 200 rpm for about 12 hours.

In a 2 L schleck flask, 60 g of the catalyst precursor A prepared in Synthesis Example 1, 3.9 g of the catalyst precursor D prepared in Synthesis Example 5, 1 L of toluene and 25 g of triisobutylaluminium were allowed to react at 40° C. for 60 minutes. Then, the reactants were added to the high-pressure reactor. The temperature was raised to 80° C. and the mixture was stirred for 2 hours. After the temperature of the reactor was lowered to room temperature, stirring was stopped, and the reaction solution was allowed to settle for 30 minutes and decanted. 3.0 kg of hexane was added to the reactor, the resulting slurry was transferred to a filter dryer, and the hexane solution was filtered. After purging at 1.5 bar with argon for 10 minutes, vacuum drying was carried out at 40° C. for 3 hours to obtain a supported catalyst.

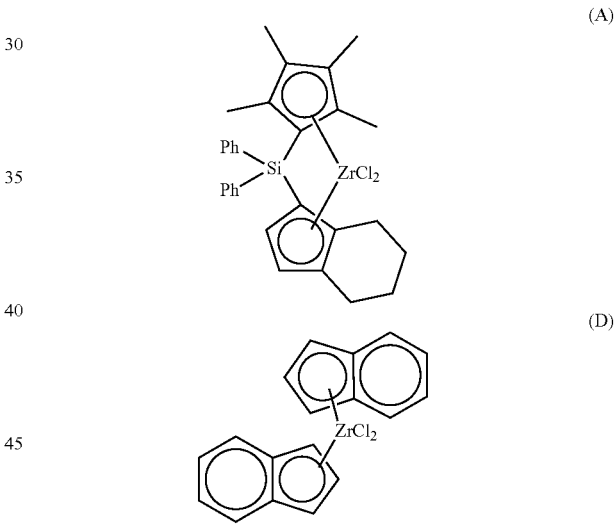

Preparation Example 3: Preparation of Supported Catalyst 4.0 kg of toluene and 800 g of silica (Grace Davison, SP2410) were added to a 10 L high-pressure reactor and stirred while raising the reactor temperature to 40° C. 1.5 kg of a 30 wt % methylaluminoxane (MAO)/toluene solution (Albemarle) was added to the reactor. After raising the temperature to 80° C., the mixture was stirred at about 200 rpm for about 12 hours.

68 g of the catalyst precursor C prepared in Synthesis Example 3, 5.1 g of the catalyst precursor E prepared in Synthesis Example 6, 1 L of toluene and 25 g of triisobutylaluminum were reacted in a 2 L schleck flask at 40° C. for 60 minutes, and the reactants were added to the high-pressure reactor. After raising the temperature to 80° C., the mixture was stirred for 2 hours. After the temperature of the reactor was lowered to room temperature, stirring was stopped, and the reaction solution was allowed to settle for 30 minutes and decanted. 3.0 kg of hexane was added to the reactor, the resulting slurry was transferred to a filter dryer, and the hexane solution was filtered. After purging at 1.5 bar with argon for 10 minutes, vacuum drying was carried out at 40° C. for 3 hours to obtain a supported catalyst.

(C)

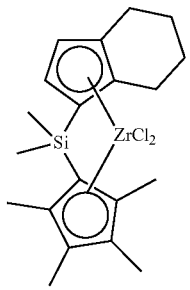

(E)

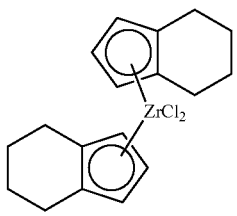

Preparation Example 4: Preparation of Supported Catalyst 1375 g of the supported catalyst was obtained in the same manner as in Preparation Example 1, except that 65 g of the catalyst precursor A prepared in Synthesis Example 1 was used In Preparation Example 1, and 5.5 g of the catalyst precursor F prepared in Synthesis Example 7 was used instead of the catalyst precursor B prepared in Synthesis Example 2

(A)

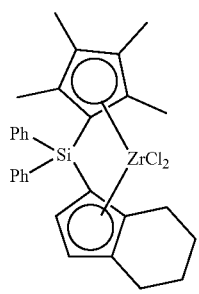

-continued (F)

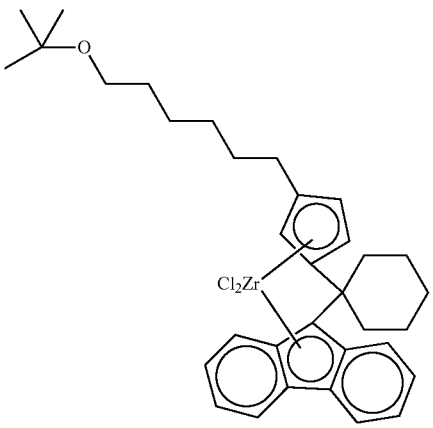

Example 1: Preparation of ethylene-1-hexene Copolymer

The polymerization reactor was operated in a continuous polymerization reactor which is an isobutane slurry loop process, with a reactor volume of 140 L and a reaction flow rate of about 7 m/s. The gas stream (ethylene, hydrogen) required for polymerization and 1-hexene comonomer were constantly and continuously added, and the individual flow rates were adjusted according to the target. The concentration of all gas streams and 1-hexene comonomer was confirmed by on-line gas chromatography. The supported catalyst was added to isobutane slurry, the pressure of the reactor was maintained at 40 bar, and the polymerization temperature was 84° C. In addition, the procedure was carried out under the conditions shown in the following Table 1 to produce an ethylene-1-hexene copolymer.

Example 2: Preparation of ethylene-1-hexene Copolymer

A polymer was prepared in the same manner as in Example 1, except that the procedure was carried out under the conditions shown in Table 1 below.

Comparative Examples 1 and 2: Preparation of ethylene-1-hexene Copolymer

A polymer was prepared in the same manner as in Example 1, except that the procedure was carried out under the contents and conditions shown in Table 1 below.

TABLE 1

| Polymerization condition | Example 1 | Example 2 | Comparative Example 1 | Comparative Example 2 |
| --- | --- | --- | --- | --- |
| Supported catalyst | Preparation Example 1 | Preparation Example 4 | Preparation Example 2 | Preparation Example 3 |
| load of ethylene (kg/hr) | 25 | 25 | 25 | 24 |
| Addition amount of hydrogen (ppm) | 12 | 9 | 6 | 8 |

TABLE 1-continued

| Polymerization condition | Example 1 | Example 2 | Comparative Example 1 | Comparative Example 2 |
|---|---|---|---|---|
| Addition amount of hydrogen (wt %) (Based on the total weight of ethylene fed in a continuous polymerization reactor | 10.5 | 10.0 | 8.8 | 9.0 |
| Slurry density* (g/L) | 560 | 562 | 552 | 556 |
| Catalytic activity** (kg PE/kg catalyst/hr) | 3.7 | 3.1 | 4.7 | 4.1 |
| Bulk density (g/ml) | 0.44 | 0.43 | 0.42 | 0.40 |
| Settling efficiency (%) | 55 | 54 | 55 | 53 |

In Table 1 above,
*Slurry density is a density of the polymer present in the continuous polymerization reactor, which is a numerical value measured through a density indicator installed in a continuous polymerization reactor.
**Catalytic activity (kgPE/g Cat): The catalyst activity was calculated by measuring the weight of the catalyst used in the synthesis reaction of Examples and Comparative Examples and the weight of the polymer derived from the above reaction.

Test Example: Evaluation of Physical Properties of Olefin Polymer

The physical properties of the olefin polymers prepared in Examples 1 & 2 and Comparative Examples 1 & 2 were measured by the methods described below, and the results are shown in Table 1.

In order to compare the physical properties of the olefin polymers prepared in Examples with the physical properties of the commercial products, Enable 2010 available from ExxonMobil Company was prepared as Comparative Example 3, and their physical properties were measured by the methods described below and the results are shown in Table 2 below.

(1) Measurement of molecular weight: The weight average molecular weight (Mw) and the number average molecular weight (Mn) of the olefin polymers were measured using gel permeation chromatography (GPC, manufactured by Waters). The analysis temperature was set to 160° C., and trichlorobenzene was used as a solvent, and molecular weight was determined by standardizing with polystyrene.

(2) $MI_{2.16}$ and MFRR (21.6/2.16): Melt Index ($MI_{2.16}$) was measured according to standard ASTM D1238 (Condition E, 190° C., load of 2.16 kg). Melt Flow Rate Ratio (MFRR (21.6/2.16)) was calculated by dividing $MFR_{21.6}$ by $MFR_{2.16}$, $MFR_{21.6}$ was measured at a temperature of 190° C. under a load of 21.6 kg according to ISO 1133, and $MFR_{2.16}$ was measured at a temperature of 190° C. under a load of 2.16 kg according to ISO 1133.

(3) Density (g/$m^3$): The bulk density of the olefin polymer was determined by measuring the weight (g) of the olefin polymer in a 100 mL container using IPT model 1132, And the density of the olefin polymer was measured according to standard ASTM D792.

(4) Storage modulus (Dyn/$cm^2$): The initial storage modulus of the olefin polymer was measured using an ARES rheometer from TA Instruments (New Castle, Del., USA). The measurement sample was set to a gap of 2.0 mm using a parallel plate having a diameter of 25.0 mm at 190° C. The measurement was performed at a stain of 5% and a frequency of 0.05 rad/s and 500 rad/sRkwl in a dynamic strain frequency sweep mode, and a total of 41 points were measured for each decade by 10 points. Among them, the storage modulus at 0.05 rad/s was measured, where the power law fitting was performed using TA Orchestrator.

(5) Haze (%): The film of the polymer (BUR 2.3, film thickness 60 μm) was prepared using a film-forming device under the following conditions, and the haze of the film was measured according to ISO 14782.

[Film-Forming Conditions]
Screw rpm: 35 rpm, processing temperature: 170° C.
Die gap: 3 mm, Dies: 100 mm (6) Haze parameter: The haze parameter of the olefin polymer was determined by the following Equation 1.

$$\text{Haze parameter} = 0.0036G' + 6.25 + 400(D - 0.920) \quad [\text{Equation 1}]$$

(7) MS (Melt Strength): The melt strength of the olefin polymer was measured using Goettfert Rheotens 71.97 attached with a Model 3211 Instron capillary rheometer. The olefin copolymer melts were discharged through a capillary die (plane die, angle of 180 degree) where a ratio (L/D) of length (L) to diameter (D) is 15. After equilibrating the sample at 190° C. for 10 minutes, the piston was moved at a rate of 1 in/min (2.54 cm/min). The standard test temperature was 190° C. The sample was uniaxially attracted by a set of accelerating nips located below the die 100 mm at an acceleration of 1.2 mm/$s^2$. The tension was recorded as a function of the attractive speed of the nip roll. The melt strength was defined as Plato force (mN) before the strands were broken. The following conditions were used for measuring the melt strength.

Plunger speed: 0.423 mm/s
Capillary die L/D: 15
Shear rate: 72/s
Wheel initial speed: 18 mm/s
Wheel acceleration: 12 mm/$s^2$
Barrel diameter: 9.52 mm
Shear rate: average value of 100-150

(8) Strength Factor (SF): SF was determined according to Equation 2 below.

$$SF = Mw/10^4 + 5/(Mw/10^5) \times \exp(\text{Ratio of increase in elongation viscosity}) \quad [\text{Equation 2}]$$

(9) Ratio of increase in elongation viscosity: First, the elongation viscosity of the olefin polymer was measured at Hencky strain rate of 1 $s^{-1}$ at 170° C. using an extensional viscosity fixture (EVF) attached to the ARES rheometer. When the extensional viscosity increase sharply while increasing steadily with time, the ratio of increase in elongation viscosity was digitized by the following criteria. Specifically, the ratio of increase in elongation viscosity was determined by dividing the measured highest elongational viscosity value by the elongation viscosity value of the extrapolated straight line at the time when the highest elongation viscosity value was obtained. Here, the extrapolated straight line was obtained by extending a straight line where a straight line having the average slope of the section where the elongational viscosity increases steadily with time to a section where the elongational viscosity increases sharply while maintaining the above average slope. Specifically, the extrapolated straight line was obtained, using Extrapolate in OriginPro 8.6 program by extending a straight line (a graph of the elongational viscosity actually measured with time) obtained by specifying the section of the X axis from 0.01 to 0.5 in Extrapolate Manu to a section where the elongational viscosity increases sharply. At his time, in order to obtain the extrapolated straight line, the method uses B-Spline, and Apparent interpolation was used in Extrapolate Manu.

(10) Blow-up ratio (BUR): Under the following film-forming conditions, if the film was stably produced when controlling the BUR to 2.7 or more under the following film-forming conditions, it was marked as 'O', and if the film was stably produced when controlling the BUR to 2.6 or less, it was marked as 'Δ'.

Screw rpm: 35 rpm
Processing temperature: 170° C.
Die gap: 3 mm
Dies: 100 mm
Film thickness: 60 μm

TABLE 2

|  | Example 1 | Example 2 | Comparative Example 1 | Comparative Example 2 | Comparative Example 3 |
|---|---|---|---|---|---|
| Mn [g/mol] | 41,000 | 41,000 | 29,000 | 43,000 | 26,000 |
| Mw [g/mol] | 107,000 | 103,000 | 146,000 | 122,000 | 88,000 |
| $MI_{2.16}$ [g/10 min] | 1.02 | 1.13 | 1.1 | 0.85 | 0.96 |
| MFRR (21.6/2.16) | 23.8 | 24.1 | 36 | 26.4 | 34.1 |
| Density [g/cm$^3$] | 0.920 | 0.920 | 0.921 | 0.920 | 0.920 |
| Storage modulus [Dyn/cm$^2$] | 880 | 1030 | 3100 | 1530 | 1550 |
| Haze [%] | 9.5 | 9.8 | 19.0 | 11.5 | 11.5 |
| Haze parameter | 9.4 | 10.0 | 17.8 | 11.7 | 11.8 |
| Melt strength [mN] | 66 | 58 | 95 | 79 | 48 |
| SF | 63 | 63 | 98 | 80 | 50 |
| Ratio of increase in elongational viscosity | 2.4 | 2.4 | 3.2 | 2.8 | 2.0 |
| BUR | ○ | ○ | ○ | ○ | Δ |

In addition, changes in the initial storage moduli of the olefin-based copolymers of Example 1 and Comparative Examples 1 and 2 according to the frequency were observed, and the results are shown in FIG. 1.

As a result of the test, the olefin polymer prepared according to Example 1 has a density equivalent to that of the olefin polymers of Comparative Examples 1 and 2, but exhibits a lower initial storage modulus, and thus has a haze parameter of 11 or less, specifically 9.4. As a result, it was possible to produce a film having improved transparency as compared with Comparative Examples 1 and 2. In addition, it was confirmed that it exhibited improved transparency as compared with Comparative Example 3, and also had a higher SF value and exhibited more excellent bubble stability.

The invention claimed is:

1. An olefin polymer having a haze parameter of 11 or less which is determined according to the following Equation 1:

Haze parameter=$0.0036 \times G' + 6.25 + 400 \times (D-0.920)$ [Equation 1]

in the above Equation 1,

D is a density of the olefin polymer measured according to ASTM D792, and

G' is a storage modulus measured at 5% strain and 0.05 rad/s in the dynamic strain sweep frequency mode using an ARES rheometer.

2. The olefin polymer of claim 1, wherein the G' is 1500 dyn/cm$^2$ or less.

3. The olefin polymer of claim 1, wherein the D is 0.910 g/cm$^3$ to 0.930 g/cm$^3$.

4. The olefin polymer of claim 1, wherein it has a strength factor of 50 or more which is determined according to the following Equation 2:

Strength Factor $(SF)=Mw/10^4+5/(Mw/10^5) \times$exp(ratio of increase in elongational viscosity) [Equation 2]

in the above Equation 2, Mw means a weight average molecular weight, the ratio of increase in elongational viscosity is a value in which the highest elongational viscosity value measured for the olefin polymer at Hencky strain rate of 1 s$^{-1}$ at 170° C. using an extensional viscosity fixture attached to the ARES rheometer is divided by the elongational viscosity value of the extrapolated straight line at the time when the highest elongational viscosity value is obtained, wherein the extrapolated straight line is a straight line in which a straight line having the average slope of the section where the elongational viscosity increases steadily with time is extended to a section where the elongational viscosity increases sharply while maintaining the above average slope.

5. The olefin polymer of claim 4, wherein the ratio of increase in elongational viscosity is 2.0 or more.

6. The olefin polymer of claim 1, wherein it has a melt index of 0.3 g/10 min or more and less than 4 g/10 min, which is measured at a temperature of 190° C. under a load of 2.16 kg according to standard ASTM D 1238.

7. The olefin polymer of claim 1, wherein it has a number average molecular weight of 20,000 g/mol to 60,000 g/mol, and a weight average molecular weight of 90,000 g/mol to 160.000 g/mol.

8. The olefin polymer of claim 1, wherein it has MFRR (21.6/2.16) of 18 or more and less than 40 in which a melt flow rate (MFR$_{21.6}$) measured at a temperature of 190° C. under a load of 21.6 kg according to ISO 1133 is divided by a melt flow rate (MFR$_{2.16}$) measured at a temperature of 190° C. under a load of 2.16 kg according to ISO 1133.

9. The olefin polymer of claim 1, wherein it has melt strength of 50 mN to 100 mN.

10. The olefin polymer of claim 1, which is a copolymer of ethylene and alpha olefin.

11. The olefin polymer of claim 1, which is a copolymer of ethylene and 1-hexene.

12. A blown film, comprising the olefin polymer of claim 1, wherein the film has a haze of 10% or less as measured according to ISO 14782.

* * * * *